May 1, 1945.  J. E. PRESTON  2,374,779
SEQUENCE TIMER AND MEASURING CONTROL
Filed March 27, 1942  10 Sheets-Sheet 1

INVENTOR
JOHN E. PRESTON
BY
Hyde and Meyer
ATTORNEYS

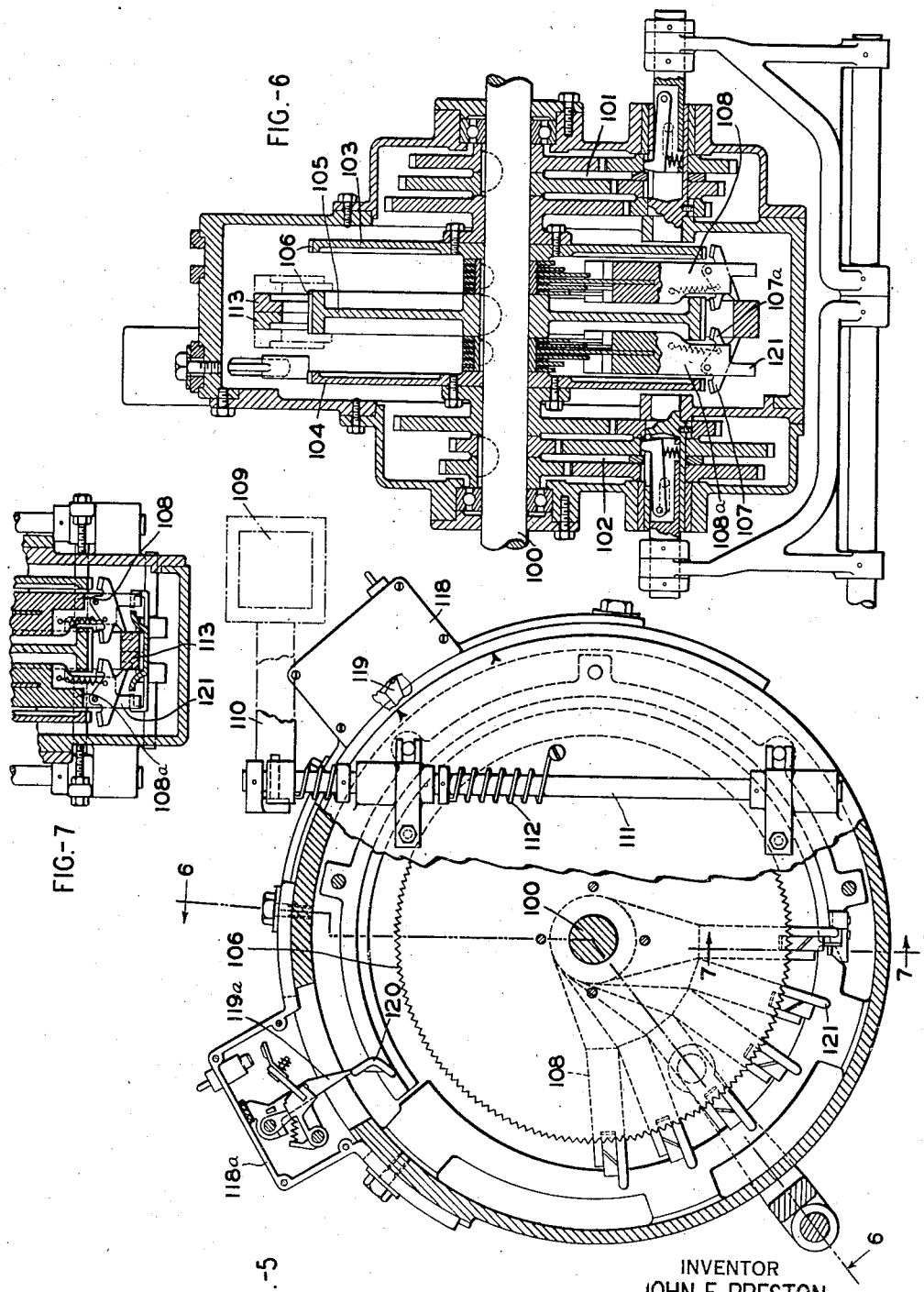

May 1, 1945.  J. E. PRESTON  2,374,779
SEQUENCE TIMER AND MEASURING CONTROL
Filed March 27, 1942  10 Sheets-Sheet 8

INVENTOR
JOHN E. PRESTON
BY
*Hyde and Meyer*
ATTORNEYS

Patented May 1, 1945

2,374,779

UNITED STATES PATENT OFFICE 2,374,779

SEQUENCE TIMER AND MEASURING CONTROL

John E. Preston, Cincinnati, Ohio, assignor to The American Laundry Company, Cincinnati, Ohio, a corporation of Ohio Application March 27, 1942, Serial No. 436,465

29 Claims. (Cl. 270—81)

This invention relates to time delay relays such as are used for producing a delayed response for any purpose, such as for indicating, recording, measuring the duration of, or causing, a definite time interval, or for measuring a dimension of articles, either as the sole duty or in connection with the performance of some operation on or with respect to them, and to the method of operation practiced by or with such relays as variously employed in the arts.

While in certain of its aspects a given embodiment of the invention may be partly or wholly of mechanical form, the invention has more particular relation to that form of time delay relay comprising a grid controlled electron discharge device whose anode-cathode circuit may be rendered conductive or non-conductive by change in or adjustment of the grid potential, together with means for changing the grid potential continuously, progressively, and in the same direction, i. e., either up or down, until, after the lapse of the total time delay period, it reaches the critical control value and thereby produces a delayed response in the anode-cathode circuit.

One object of the invention is to provide means and a method for controlling the duration of the time period which elapses before the grid potential reaches the critical control value, by splitting up, as it were, the total time delay period into at least two portions during one of which the change in or adjustment of said potential occurs at one rate, and during another of which it occurs at a different rate, thereby enabling any time delay period, within limits, to be produced, caused or measured, and always with a proportionate relation to the maximum possible time delay with the particular relay being operated.

Another object of the invention is to provide, in connection with a time delay relay of the character described, improved means and method for operating such relay variously during different cycles of operation, thereby to secure, produce, or measure different time intervals bearing a proportionate relation to each other or to the maximum possible time interval, and more particularly to secure the benefits of such proportionate relation by a division of the time interval into at least two portions variously related and the selection of different rates of adjustment of the grid potential during corresponding portions of the same interval.

Another object of the invention is to provide time delay relay means of the character described, in which the time delay period is determined by progressively modifying or adjusting the potential of the grid circuit of an electron discharge device in one direction, i. e., either up alone or down alone, until it reaches the cut-off point or critical control value, and more particularly, by varying the rate of adjustment of grid potential during different portions of the time delay period, thereby to vary duration of such period.

A further object of the invention is to provide an improved time delay relay of the character described, in which the time delay is determined by charging or discharging capacitance affecting the operation of the grid circuit of the electron discharge device, and more particularly, in which the rate of charge or discharge of such capacitance is changed during the period of delay, thereby to adjust the duration of such period.

A further object is to provide improved time delay relay means which, at least partly, is of electrical form, including an electron discharge valve or device, whose action is controlled by a plurality of the trip fingers or devices before referred to, enabling the control circuits and system to be simple in form and more certain and exact in operation, and adjustable for the production of any desired results.

Another object of the invention is to provide improved method and means for employing such a time delay relay in the operation of measuring articles of varying length, and particularly articles which vary in length between a predetermined minimum and a predetermined maximum, by first discarding, as it were, from the length of each article, a predetermined length, such as the length of a minimum length article, and then measuring the remaining portion of the length of the article, thereby simplifying the operation by reduction in the total length to be actually measured.

Another object of the invention is to provide improved apparatus of this kind, including means for performing an operation with respect to an article and means for producing relative travel along a path between such means and the article, in which measurement of the article is performed by the use of a plurality, such as two, of trip fingers or devices spaced apart along said path of travel, which not only adapts the mechanism to the use of simplified and improved time delay relay means, such as that before described, but also simplifies and improves the measuring operation by the opportunity to discard a portion of the length of the article during the measuring operation.

A further object of the invention is to provide improved means for controlling the circuits to the electron discharge device by an interlock, as it were, in said circuits, permitting articles to be measured to be fed in rapid succession, with minimum space or gap between the trailing edge of one article and the leading edge of the following article, without interference by the following article with the measuring operation being performed upon the leading article.

A further object of the invention is to provide improved means of simple form for producing a multiplicity of measuring operations with respect to the same article, so that points may be determined at various proportionate distances from an end thereof during one passage of the article with respect to the measuring devices.

A further object is to provide improved means, in a time delay relay of the character described, for charging the control capacity, either by half wave rectification of an electron discharge device, by full wave rectification thereof, or by a voltage controlled in accordance with the rate of travel of the article being measured.

Further objects of the invention are in part obvious and in part will appear more in detail hereinafter.

The present invention is useful for a wide variety of purposes and is understood not to be limited to any particular method or device here chosen for purposes of illustration and described more or less in detail.

In one of its broad aspects and considered alone from the standpoint of its embodiment in the electrical form including an electron discharge device, the invention is of use for a wide variety of purposes and in many different ways. For example, without any effect upon an outside load or device, it may be used solely for the purpose of determining or selecting or indicating time periods, particularly when of relatively short duration, such as intervals of a fraction of a second or a few seconds, although the invention is useful for longer periods of time. It may be entirely manually controlled, producing or giving some evidence of the lapse of a given time interval, or by association with other apparatus may determine or indicate a period of time involved in its operation, such as the length of the dot or dash in the Morse telegraphic code, the time required for an elevator to advance one floor, or for like uses. Again, it may be employed for measuring purposes, either to measure time intervals or even distances. For example, relays of this kind may be employed wherever it is desired to measure, more or less automatically, a series of articles of any kind which vary in one dimension, such as length, either for the sole purpose of determining the length of the article, or of indicating that length, as by a signal, or of determining that length for the purpose of performing some operation with respect to the article at a point located upon it proportionately according to its length. For example, it may be desirable to sever a series of articles, such as wire rods, each exactly at its mid-point, or at a point located a third or a quarter or some other proportionate distance from one end, regardless of its length. Or, it might be desirable to indent or to punch a hole in each of a series of metal strips, at points similarly located, regardless of varying length in the articles of a series. Again, the invention may be employed in connection with the printing of a legend at the quarter point, third point, mid-point or some other point of each of articles varying in length. And again, the invention may be employed in connection with folding machines for sheets or strips of leather, composition sheet material, various textile fabrics, paper or the like. For convenience, and in no sense of limitation, the invention will be described first in connection with a folding machine for producing transverse folds at one or more points distributed along the length of articles made of textile fabric, such as is used in the folding of sheets, table cloths, pillow slips, towels and like articles of flatwork subsequent to the usual laundering operations performed upon them, all without reference, except such as may be necessary or desirable, to other uses of the invention, some of which will be later referred to more in detail.

My new and improved method of measuring, when used for predetermining the locations of the transverse folds in textile fabric towels, proceeds upon the assumption that the articles to be measured vary in length between a preselected minimum and a preselected maximum. Such towels, in a folding machine, are advanced along a path to a suitable folding device, such as a pair of rolls and a folding blade for tucking the article between them. Of course, when the articles vary in length, they can be moved, one by one, past a trip finger which takes account of the leading edge of the article, its rate of travel, and its trailing edge, so that when the trailing edge reaches the trip the total length of the article has been measured and determined. Assuming, for example, that the transverse fold is to be made at exactly the mid-point, the folding device, i. e., the folding blade and rolls in the specific form referred to, may be located beyond the trip a distance equal to one-half the length of the maximum length article, in which case it may be actuated immediately the trailing edge of a maximum length article engages the trip. Then, when a shorter article, say one of the minimum length, is advanced until its trailing edge engages the trip, it must be advanced still farther before its mid-point reaches the folding point. The amount of such advance will depend upon the location of the fold. When the fold is to be at the mid-point, as referred to, the amount of advance is one-half of the difference in length between the particular article and the length of the maximum length article.

So, in the operation of a folding machine upon a series of such articles, two things are necessary, first, the measurement of the article, usually accomplished when its trailing edge reaches a definite point, and second, any advance of the article to the folding point, if it is shorter than the maximum length.

As will be described more fully hereinafter, I simplify and improve the method of measuring, in apparatus of this kind, by a procedure which in effect subtracts from the length of each article a predetermined definite length, usually the length of the minimum length article, and measures only the balance of the length. In other words, I measure, on each article, only its excess in length over the minimum length. Subsequently, in accordance with that measurement, the article is advanced, if necessary, until the point upon it to be folded reaches the folding device.

Control of the measuring devices may be entirely mechanical, entirely electrical, or a combination of the two, and in some cases might include other forms of power transmission or conversion, such as the use of fluid pressure. In the machine first to be described, the control is entirely electrical and includes an electron discharge valve or device of any suitable type. In such devices, one effect is the relaying, into the anode-cathode circuit of the effect of variations in potential in the grid circuit. The electron discharge device has a cut off point, i. e., its potential has a critical control value above which its anode-cathode circuit is nonconductive or does not pass current, and below which the circuit is conductive.

I utilize such a valve device by the application thereto of means to adjust or vary its grid potential, by either raising or lowering the same, until it reaches or arrives at the cut-off point, thereby producing a response in the anode-cathode circuit, by rendering the same either conductive or nonconductive. One suitable way of so controlling the electron discharge device is by the inclusion in its grid circuit of a capacitance which is charged or discharged in any suitable manner, to vary the grid potential. For example, assuming the capacitance charged, at the instant of initiating operation of the device as a relay, the capacitance begins to discharge, the operation continuing over an appreciable period of time, by which I mean a time period sufficient to enable the full length or a desirable proportion of the full length of an article to pass a given point, a period of the order of one second or a fraction thereof, more or less. While any method of controlling the charge or discharge of the capacitance may be employed, one simple way of doing so is by the use of variable resistance in shunt with the capacitance.

In that form of the present invention to be first described, according to my new method of measurement, I vary the time delay period by varying the potential of the grid circuit, and modifying the rate of variation of potential during different portions of the time delay period. Thus I am able to vary the total length or the duration of the time delay period in accordance with the length of each article being measured by the apparatus. That may be accomplished, for example, assuming a charged condenser in the grid circuit of the electron discharge device, by discharging its charge progressively and continuously by successive increments, one increment at one rate and another increment at another rate, the change in rate being effected in any suitable manner, such as by variation in resistance, and in a manner not only to take account of the length of the article, but also to cause its advance to the proper position for folding, in accordance with its length.

It is realized, of course, that the discharge of a condenser, employed in the manner described, and the consequent variation in potential in the grid circuit of an electron discharge device, are functions which do not vary along a straight line, but along a curved line. But the departure from straight line variation, particularly in that portion of the curve employed in practice, is not so great as to be of material importance in practical uses of this invention, and may be disregarded. Again, I realize, assuming a charged capacitance in circuit with the grid and maintaining grid potential at a value other than that of the cut-off point, when said condenser is discharged to an extent sufficient to cause the grid potential to reach the cut-off point or critical control value, the capacitance may not be completely discharged. It may still hold or retain traces of a charge, as it were. But such remaining charge is of no importance and again may be disregarded, so that in the description and claims hereinafter, for convenience, I will speak of the capacitance as discharged or substantially discharged, when it is discharged to an extent sufficient to cause the grid potential to reach the cut-off point or critical control value.

With all the foregoing in mind, reference may now be had to the drawings, which illustrate several embodiments of the invention, and in which, throughout, similar reference characters represent the same or corresponding parts in all views.

Fig. 5 is a detail sectional view of a portion of the timer;

Fig. 6 is a sectional elevation on the line 6—6, Fig. 5;

Fig. 7 is a detail fragmental section on the line 7—7, Fig. 5;

Figure 1:
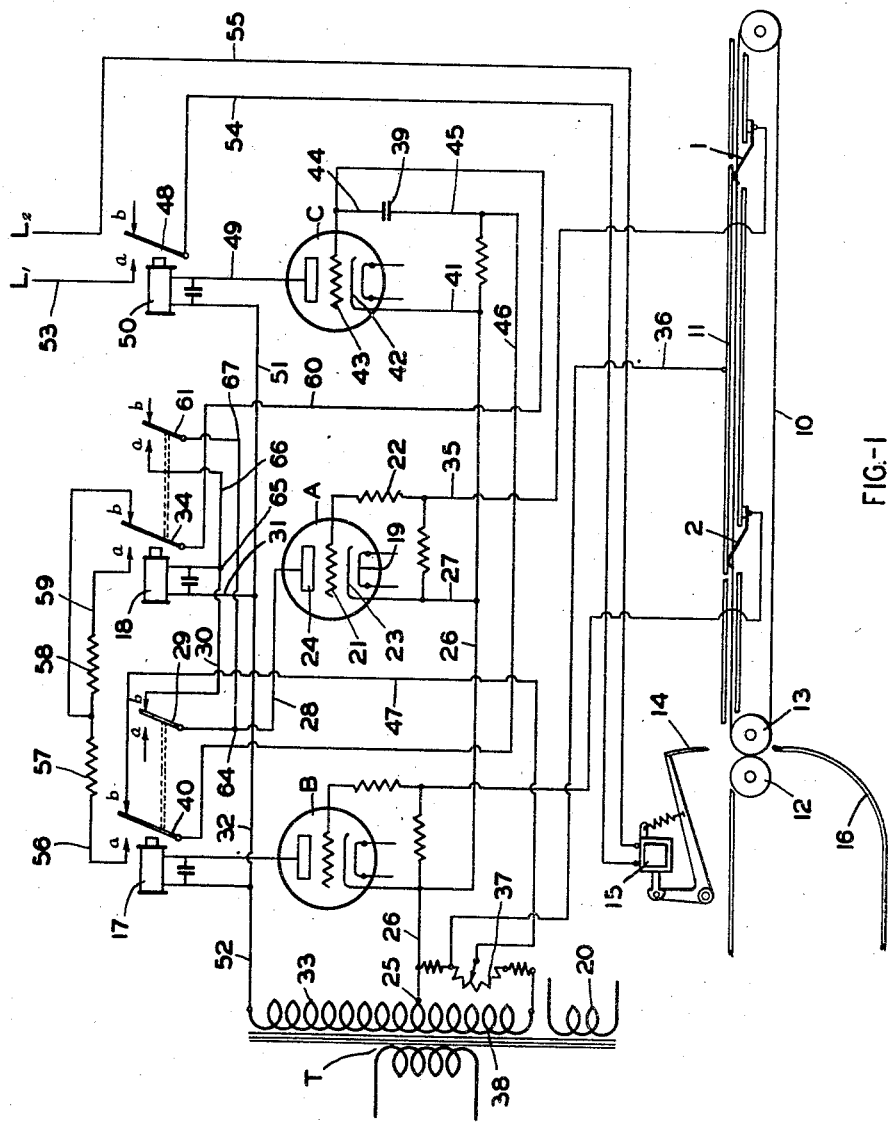
Fig. 1 is a diagram, illustrating the invention applied to a folding machine provided with electrical control and relay devices for measuring articles varying in length and determining the location of a single point thereon, such as for producing a single cross fold, and also providing a compelling interlock so that articles can follow each other in close succession.

Fig. 1 illustrates diagrammatically, an apparatus to which my form of control is applicable, and also the circuits which are utilized when the energy store to be dissipated is represented by an electrical charge in a condenser. As representative of an operation to be performed I have selected the folding of an article of laundry at a fixed position relative to the article length, for instance, as first described, a transverse fold at the mid-point, although, as before stated, the same control system and apparatus may be used for measurement alone, or for the performance of any operation with respect to articles, according to their length.

The folding machine may be of any suitable type and is illustrated more or less conventionally, because the details of its mechanism form no part of the present invention. The machine, for example, may be of the same general form illustrated, described and claimed in my copending application for Folding machine and control therefor, filed of even date herewith, Serial No. 436,466, to which reference may be had if desirable or necessary.

Referring to the folding machine, as illustrated in Fig. 1, the articles to be folded are advanced from right to left on the upper run of an endless conveyor 10, and as an article thus advances, it first interrupts the electrical contact between a suitable first trip device 1 and conducting plate 11, and then between a second trip device 2 and the same plate 11, the effect of which interruptions will later appear. The article next passes above rotating rolls 12 and 13, which rolls cooperate with blade 14 to execute a transverse fold in the article whenever blade 14 is operated so as to move downwardly, such operation being motivated by energization of solenoid 15. Operation of said blade, in conjunction with pinch rolls 12 and 13, produces a transverse fold, and the folded article leaves the apparatus by chute 16.

Tubes A, B and C are standard three-element, separate heater, A. C. electron discharge valves. Tubes A and B respectively cooperate with trips 1 and 2 to energize or deenergize relays 17 and 18 in the following manner, the tube A being selected for a detailed explanation.

The filament 19 of tube A is energized from secondary 20 of transformer T, the wiring for this purpose being partly broken away to simplify the diagram. The grid 21 of tube A is normally biased by resistor 22 to permit the passage of plate current from cathode 23 to plate 24. Under such normal bias, plate current flows through the following circuit: from point 25 in the secondary of transformer T through conductors 26, 27, cathode to plate of tube A, conductor 28, armature 29 of relay 17, wire 30, wiring of relay 18, conductors 31 and 32 to the secondary of transformer T. When relay 18 is energized by a rectified half-cycle from transformer secondary 33, armature 34 moves from position $b$ to position $a$. This performance of tube A takes place only when the grid is on normal bias, but, as will immediately appear, such normal bias is disturbed, and the tube is overbiased, as long as contact finger 1 is in contact with plate 11.

When finger 1 touches plate 11 a supplementary grid bias is imposed on grid 21 of tube A by means of the following circuit: from terminal 25 on the secondary of transformer T through conductors 26 and 27, cathode to grid of tube A, resistor 22, conductor 35, contact 1, plate 11, conductor 36 to voltage divider 37 across the secondary 38 of transformer T. This supplementary grid voltage is sufficient to block plate current in tube A so that when finger 1 is in contact with plate 11, tube A passes no plate current, relay 18 is deenergized, and armature 34 falls by gravity or spring bias to position $b$.

In similar manner finger 2, when in contact with plate 11, imposes a supplementary grid bias on tube B, likewise blocking plate current therethrough and deenergizing relay 17. Tubes A and B therefore serve as boosters in the respective functioning of relays 18 and 17, and said relays are sensitive to the passage of an article between plate 11 and the spaced trips 1 and 2.

*Charging of control condenser by half wave rectification*

Measurement of the article and its positioning at the time of fold are accomplished or controlled by the third electron discharge valve or device and associated capacitance, as will now appear.

The accumulation and dissipation of an energy store, represented by the charging and discharging of capacitance or condenser 39, are controlled by said relays 17 and 18 as will appear.

Condenser 39 is charged by means of the rectified half-cycle of grid current of tube C. Condenser 39 is being charged only when finger 2 touches plate 11 so as to block tube B, deenergize relay 17, and place armature 40 in position $b$. Said charging current originates in the voltage divider 37 across secondary 38 of transformer T, and proceeds as follows: from terminal 25 through conductors 26 and 41, cathode 42 and grid 43 of tube C, conductor 44 to condenser 39 and from said condenser through conductors 45 and 46, armature 40 in position $b$, and conductor 47 back to the voltage divider 37. The manner of discharge of condenser 39 will later appear.

As long as condenser 39 is charged, its potential is superimposed on the normal bias of tube C, said tube is overbiased, and plate current therein is interrupted so that armature 48 falls to position $b$. Whenever said condenser 39 is discharged the tube C operates under normal bias and passes plate current through the following circuit: from secondary 33 of transformer T, through conductors 26 and 41, cathode to plate of tube C, conductor 49, relay windings of relay 50, conductors 51 and 52 back to secondary 33. Relay 50 being thus energized, armature 48 moves to position $a$, and thereupon current flows from $L_1$ through conductor 53, armature 48 in position $a$, conductor 54, windings of solenoid 15, and conductor 55 to $L_2$.

Solenoid 15, when energized, may operate any suitable device, such as a signal, an indicator or recorder of length, a cutter, a printer, or like device, but of course, is here shown as operating blade 14 to perform a folding operation as heretofore mentioned.

This sequence of operations therefore follows immediately on discharge of condenser 39 to its end point, said end point representing that point at which the charge remaining in condenser 39 is insufficient to block tube C. The discharge of condenser 39 to such end point therefore controls the timing of the folding operation.

I shall now explain the manner in which an operation can be timed to be performed at corresponding points on a traveling succession of articles of lengths varying between a fixed minimum and maximum.

*Single operation on articles of varying lengths*

Let us assume that an operation is to be performed at the mid-point of a series of articles. For reasons which will become apparent, the longest article to which the control herein disclosed is applicable is an article whose mid-point registers with blade 14 as the trailing edge passes finger 1, and the shortest article is one whose leading edge is just displacing finger 2 as its trailing edge leaves finger 1.

Consider first the effect produced by the passage of an article of maximum length past the two contact fingers. As its leading edge passes finger 1, tube A begins to pass plate current for reasons already explained, and armature 34 moves to position $a$. As the leading edge passes finger 2, tube B passes plate current and armature 40 moves to position $a$. At this moment condenser discharge is through the following circuit: from condenser 39 through conductors 45 and 46, armature 40 in its $a$ position, conductor 56, resistors 57 and 58, conductor 59, armature 34, in $a$ position, and conductor 60 back to the condenser.

The charge in condenser 39 has been so proportioned with relation to the resistance value of the discharging circuit, including resistors 57 and 58, that the discharge reaches its operative end point at the moment when the mid-point of the article registers with blade 14. At this moment therefore blade 14 is operated, as previously explained, and this maximum length article is folded at its mid-point. Also, as explained in the previous paragraph, at the moment the mid-point registers with blade 14, the trailing edge passes finger 1, but since the condenser has discharged to an end point and the fold has been executed, the effect of contact between finger 1 and plate 11 is of no significance.

As soon as the trailing edge of the article passes finger 2, the condenser is again charged by means of the circuit previously outlined.

We will now consider what takes place when an article of intermediate length is to be folded. As before, when the leading edge of the article passes finger 1 and intercepts finger 2, the condenser discharge begins. Since the article is shorter than the maximum length its trailing edge will pass finger 1 before its mid-point has reached blade 14 and before condenser 39 has discharged to its end point. Likewise, since the article is shorter than the maximum length, and since, at ordinary discharging rate, its mid-point would pass blade 14 before the discharge end point is reached, I have provided means sensitive to contact of finger 1 with plate 11 whereby the discharging rate is accelerated as soon as the trailing edge passes finger 1. The shorter the article, therefore, the sooner the accelerated rate of discharge begins. This will be illustrated, with quantitative values, hereafter.

When the trailing edge of this intermediate length article passes finger 1, tube A is overbiased, relay 18 is deenergized, and armature 34 falls to position b. The discharge of condenser 39 which at normal rate proceeded through resistors 57 and 58 is now shunted around resistor 58 and passes through armature 34 in b position, and conductor 60. This reduces the circuit resistance to one-half of its previous value and the discharge rate of condenser 39 is therefore doubled, so that the discharge end point is again reached when the mid-point registers with blade 14, whereby the folding operation is executed as before.

The minimum length of article which may be successfully controlled for an operation of the nature described is obviously one in which the discharge proceeds wholly at the accelerated rate. This means that as finger 2 is intercepted by the leading edge, the trailing edge is just leaving finger 1, thus shorting out resistor 58 for the complete operation.

Several concrete examples will now be given to quantitatively illustrate the operation of my control device.

Assume that the longest article to be folded is 36 inches in length. This means that complete discharge of condenser 39 is permitted to proceed at the original retarded rate which in turn means that when blade 14 is operated, the trailing edge must be just leaving finger 1, or, in other words, that the distance from blade 14 to finger 1 is one-half the length of the article, or 18 inches.

Assume further that the shortest article to be folded is 12 inches in length. We have shown above that this length determines the spacing of fingers 1 and 2, and therefore finger 2 is 12 inches from finger 1 and 6 inches from blade 14.

To determine the proper energy charge for condenser 39, for convenience we will refer to that increment of capacitance which at normal rate discharges during a one inch advance of the article as one unit of energy. As the leading edge of a 36 inch article intercepts finger 2, condenser discharge begins. Since fingers 1 and 2 are 12 inches apart, there still remain 24 inches of article length back of finger 1. Since these 24 inches must pass finger 1 before operation of blade 14 (as explained heretofore in discussion of the fold for a maximum length article) the condenser charge should represent 24 units of energy. When discharged at normal rate, the trailing edge will arrive at finger 1, and the mid-point of the article simultaneously at blade 14, when the energy charge is dissipated.

Consider now what happens when an article of 24 inches length is to be folded at the mid-point. As normal discharge begins, twelve inches of the article is still back of finger 1, and normal discharge continues while these twelve inches travel past finger 1, thus dissipating 12 units of energy out of the original 24 unit charge. When the trailing edge of the article reaches finger 1, the mid-point of the article is still 6 inches away from blade 14. If blade 14 is to be actuated when this mid-point is registered with the blade, the remaining 12 units of energy must be dissipated while the towel is moving 6 inches, or at double rate. As already described, this is exactly what happens, since the accelerated rate begins as soon as the trailing edge passes finger 1.

With an article of minimum length, in this case 12 inches, discharge immediately begins at the accelerated rate since the trailing edge is leaving finger 1 as the leading edge contacts finger 2. At this time the mid-point of the article is 12 inches from blade 14, and, at the accelerated discharge rate, the 24 units of energy will be discharged to an end point simultaneously with the arrival of the mid-point of the article to registry with the blade.

The following relationships between the several variables (such as the article length, the amount of energy charge, the spacing of the contact fingers with respect to each other and to the folding blade) appear from a consideration of the above quantitative examples.

For a mid-point operation, if the minimum length of article be represented by $X$, the spacing between contact fingers also has a value $X$, and the maximum length of article is $3X$. The distance from finger 1 to the operation point is one and one-half $X$ or $$\frac{3X}{2}$$

The energy charge is the number of units represented by $2X$. For articles of any length "$L$," it will be apparent, from a consideration of any number of examples within the above maximum and minimum article lengths, that if we term the normal discharge rate the "first increment of discharge" and the accelerated rate as the "second increment of discharge," then the energy discharged during this first increment corresponds to the difference between the length of the article and that of the minimum length article, or $L-X$, and the energy discharged during the second increment corresponds to the difference between the maximum length and the length of the article, or $3X-L$.

For a fold at any other point, such as a fold at one-fourth the article length from its trailing edge, the same control principle is used except that the values of resistors 57 and 58 (Fig. 1) are proportioned to permit a discharge at four times the original rate, as soon as the trailing edge passes finger 1. The sequence of steps and the circuits involved are identical with those just described for the mid-point fold.

The following numerical relationships may be established for a fold at one-fourth the article length from the trailing edge. The maximum length of article will have its quarter point in registry with the operation zone, or folding blade, when its trailing edge is passing finger 1, and the minimum length article will be equal to the distance between contacts 1 and 2 as before. If we let X represent this minimum length article, then the maximum length will be 5X, the distance between contact fingers will be X and the distance from the folding blade to finger 1 will be one and one-quarter X or $$\frac{5X}{4}$$

The units of energy will be represented by 4X.

Operations at other corresponding points on articles of various lengths may be performed in accordance with the principles above disclosed, and the numerical relationships between the several variables may be determined as readily as were the numerical examples above.

In the folding of articles, such as towels, of different lengths automatically, it is necessary to select a fold point which divides the towel fractionally, that is, in halves, in quarters, etc. For the automatic measurement of the article a trigger or contact or trip finger of some kind is imposed in the path of the travel of the article, so as to measure the time required for the article to pass the trip point. This measurement of the length of the article terminates when the trailing edge of the article has passed the trip point, and is a product of the speed of the article and the time period required for its passage. We will call this period "A" time.

The folding device is usually located at a distance from the trip equal to the length of the longest article from its fold point to its trailing edge. Therefore, all shorter articles, after passing the trip, must be moved forward for an additional time period until their fold points reach and register with the folding device. This additional time is always a definite fraction of "A" time. The particular fraction depends on whether the article is to be folded in half, quarter or some other fraction of its length. We will call this second time period "B" time. If the towel is to be folded in half, "B" time will be half of "A" time, etc.

The total time, or the sum of these two time periods, is the time required from the start of the measurement to the time at which the preselected fold point arrives at the folding device. We will call this total time "C" time.

In folding articles as they travel along a path to a folding device, the device must make the fold upon the expiration of "C" time, which is the sum of "A" time and "B" time.

Now, if we know the "C" time required for the longest article and designate it "D" time, we can refer all shorter articles to it and determine the "C" time for each, by the following equation:

$$C = A + (D - A)E$$

in which E is the fractional part in which the article is to be folded, viz. one-half, one-quarter, one-third, etc.

Interlocking control

In the preceding section we have explained that when the trailing edges of articles of intermediate or minimum length pass finger 1 (Fig. 1), resistance 58 is shunted out of the discharge circuit of condenser 39 and discharge proceeds at an accelerated rate. It is apparent that if another article follows immediately behind the first, this second article will break contact between finger 1 and plate 11, tube A will immediately pass plate current to energize relay 18, armature 34 will move to position a, and the discharge rate will instantly proceed at its original retarded rate, thus destroying the accuracy of the timing operation on the first article. While various mechanical expedients can be made available to slow down succeeding articles sufficiently to permit a completed measuring operation on each one before the following one reaches finger 1, I have provided means for interlocking the relays 17, 18 which permits articles to follow each other in closely spaced succession, the only requirement being that finger 2 is momentarily permitted to contact plate 11 after each article passes, whereby condenser 39 is charged for each article in manner hereinbefore described.

This modified circuit, which I term the "interlocking control," is also illustrated in Fig. 1. I have there shown a second armature 61 for relay 18, and a second armature 29 for relay 17. These armatures are associated with the plate wire 28 of tube A, and either or both may be in such position as to permit the flow of said plate current, as will appear. This interlock is not always necessary, however, and in some cases may be omitted.

The charging and discharging of condenser 39 proceed through the same circuits before described. The interlock merely prevents interference by armature 34 with the accelerated discharge rate, once it has been initiated.

To explain the operation of this interlock let us consider the folding of an article of intermediate length, requiring an increment of condenser charge at an accelerated rate, there being a second article following immediately thereafter. Now, when the tube is normally biased, plate current for tube A may flow through a main circuit as follows: from secondary 33 of transformer T through conductors 26, 27, cathode to plate of tube A, conductor 28, armature 29 in b position, conductor 30 to relay 18 and from relay 18 through conductors 31, 32 and 52 back to the transformer secondary. Originating at points 64 and 65 in this circuit is a shunt circuit consisting of conductor 66, armature 61 in a position and conductor 67. This parallel arrangement of armatures 29 and 61 permits plate current to flow in normally biased tube A either if armature 29 is in position b, or armature 61 is in position a.

Assume that the trailing edge of the first article has passed finger 1, tube A is therefore overbiased by a cut-off voltage and passes no plate current, and armatures 34 and 61 fall to position b. Since finger 2 is not in contact with plate 11, tube B is passing plate current and armatures 40 and 29 are in position a. Since therefore armature 29 is in position a, and armature 61 is in position b, the parallel circuits thereby controlled are open, relay 18 in series with said circuits is not energized, armature 34 is in position b, and discharge proceeds at accelerated rate, without interruption until terminated in the usual way before described, for reasons as follows:

While this discharge is proceeding at said accelerated rate, assume that a second article interrupts contact between finger 1 and plate 11. Without the interlock circuit described, this would throw armature 34 over to position a and interfere with the accelerated charging rate, but with the interlock circuit no result is produced because the plate current circuit of tube A is broken at both armatures 29 and 61. This condition is maintained until the trailing edge of the first article passes finger 2, at which time of course condenser 39 has been completely discharged. Tube B is then overbiased, and armatures 40 and 29 fall to position b. Armature 29 completes the plate circuit of tube A, armatures 34 and 61 are drawn to their position a by relay 18, and as soon as the leading edge of the second article reaches finger 2 a new cycle begins. Condenser 39 was recharged in the fractional part of a second intervening between the departure of the trailing edge of the first article from finger 2 and the arrival at said finger of the leading edge of the second article.

*Circuits for double operation*

It is frequently desirable to perform a double operation at spaced points on each of a succession of articles advancing on a conveyor. As an example of such a double operation we may consider the folding of an article first at its midpoint and then again at the middle of the once folded article, a type of double fold which we may term a half-quarter fold. Since mechanical limitations render it necessary that said folds be executed in chronologically spaced sequence, I have found it desirable to provide two energy stores represented by two charged condensers, each of which controls its own electron discharge valve and the corresponding folding blade of the folding machine.

Figure 3:
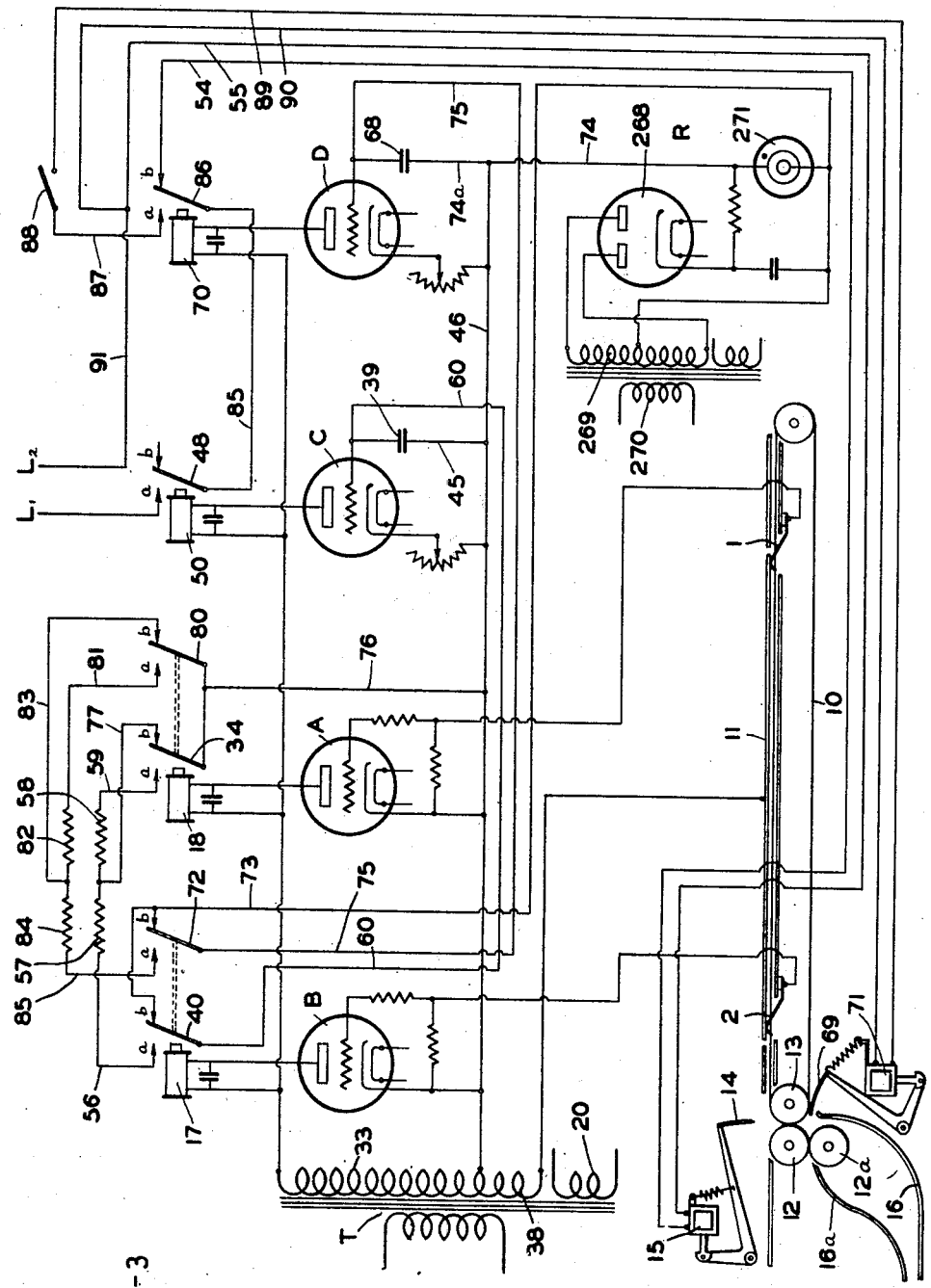
Fig. 3 is a similar view illustrating an arrangement for measuring successive articles and determining the location of two points on each, in proportion to the length of each, such as for producing two cross folds.

A circuit arrangement for such double operation is shown in Fig. 3. In this arrangement condenser 39 controls the operation of blade 14 for the half fold, as before, and condenser 68 controls the operation of a second blade 69 for the quarter fold. In conjunction with condenser 68 I have provided an additional tube D, and associated therewith a relay 70 and a solenoid 71 for operation of blade 69.

As in the previously discussed embodiment, finger 2 controls the operation of tube B and relay 17, which relay is here provided with two armatures 40 and 72. The a and b positions of armature 40 respectively determine the charging and discharging of condenser 39 and the a and b positions of armature 72 function similarly for condenser 68, as will be described more fully hereinafter. Resistors 57 and 58 when in series permit a normal discharge rate for condenser 39 and resistor 57 alone permits an accelerated discharge rate. Resistors 84 and 82 function similarly for condenser 68.

Charging of the capacitance 39, 68, may be accomplished in the same manner as charging of capacitance 39 in Fig. 1, to-wit, by a rectified half cycle of A. C. current originating in the secondary 38 of transformer T and rectified by the familiar one-way valve action of the electron discharge devices C, D. However, in the arrangement shown in Fig. 3 the condensers 39 and 68 are charged by full wave rectification from a separate source.

The diagram shows a rectifier R, which includes a standard full wave rectifier tube 268 which receives A. C. current from the secondary 269 of transformer 270 and delivers rectified current which is regulated by a voltage regulator tube 271. The condenser charging current proceeds as follows: from condenser 39 through conductor 60, armature 40 in position b, conductor 73, to rectifier R, and from the rectifier through conductors 74, 46 and 45 to condenser 39. The condenser is being charged when finger 2 is in contact with plate 11, so that armature 40 is in position b.

The charging circuit for condenser 68 is as follows: from condenser 68 through conductor 75 and armature 72 and wire 73 to rectifier R, and from the rectifier through conductors 74, 74a, to condenser 68. This condenser also is being charged only when finger 2 is in contact with plate 11, so that armature 72 is in position b.

When the leading edge of an advancing article intercepts finger 2, condensers 39 and 68 simultaneously begin to discharge. Condenser 39 discharges as follows: from the condenser through conductors 45, 46 and 76, armature 34, either conductor 59 or 77 dependent on position of armature 34, through resistors 58 and 57 or resistor 57, conductor 56, armature 40 in position a, conductor 60 back to condenser 39.

Condenser 68 simultaneously begins to discharge as follows: from the condenser through conductors 74a, 46 and 76, armature 80, either conductor 81 and resistor 82 or conductor 83, depending on position of armature 80, resistor 84, conductor 85, armature 72 in position a, conductor 75 back to condenser 68.

The manner whereby armatures 34 and 80 control the normal or accelerated rate of discharge of respective condensers 39 and 68 depending on article length as determined by finger 1 has heretofore been fully explained in connection with Fig. 1, and therefore need not here be repeated in detail.

In the specific arrangement now being described, for half-quarter fold, the charge in condenser 39 is so proportioned relative to that in condenser 68, that condenser 39 always completes its discharge first. This permits tube C to pass plate current and energize relay 50, causing armature 48 to move to position a, thereby causing energization of solenoid 15 as follows: current from L₁ proceeds through armature 48 in position a, conductor 85, armature 86 in position b, conductor 54, windings of solenoid 15, and conductors 55 and 91, to L₂. Energization of solenoid 15 operates blade 14 to execute the half fold between rolls 12 and 13.

The charge in condenser 68, for the quarter fold, is being dissipated in a similar manner and normally would reach an end point as the proper operation point registers with blade 14. It is necessary, however, that the quarter fold follow the half fold, so that blade 69 is beyond blade 14, and condenser 68 must include an additional increment of charge compelling it to reach its discharge end point only when its quarter point registers with blade 69. At this moment discharge of condenser 68 is completed, tube D passes plate current, relay 70 is energized, armature 86 moves to position a, and solenoid 71 is energized as follows: from L₁ through armature 48 in position a, conductor 85, armature 86 in position a, conductor 87, switch 88 in closed position, conductor 89 to solenoid 71, and from solenoid 71 through conductors 90 and 91 to L₂. Energization of solenoid 71 causes operation of folding blade 69 which, in conjunction with rolls 12 and 12a, folds the article at the quarter point.

To clarify the operation of the control device for a half-quarter fold, we will consider the performance of an actual operation of this nature, using quantitative values, the control being of course adaptable to other values than those given hereinbelow.

Let us assume that the maximum length of article to be folded is 36 inches. As explained in connection with Fig. 1, to produce a fold at the middle of such article, finger 1 should be 18 inches from blade 14. In spacing finger 2 we must first determine the length of the shortest article to which we desire to impart a quarter fold, and let us assume that this length is 18 inches. Finger 2 must be placed close enough to blade 69 so that the trailing edge of the article will pass finger 2 before the second operation is performed, because as soon as the trailing edge passes finger 2, condenser 68 is again under charge, and blade 69 will no longer be operated during this cycle.

Therefore when blade 69 is executing a quarter fold on an 18 inch article the trailing edge of said article extends back along the conveyor and finger 2 must not be more than 4½ inches from blade 69. Allowing 1½ inches for the distance between the operation points of blades 14 and 69, finger 2 may be placed 3 inches from blade 14 towards finger 1, and a distance of 15 inches separates fingers 1 and 2.

Now when the forward edge of a 36 inch article intercepts finger 2, the middle of the article is 21 inches from the operation point of blade 14, and 21 units of energy, represented by the charge of condenser 39, must be dissipated to time the operation of blade 14. This represents the proper charge for condenser 39.

The charge for condenser 68 is also amenable to calculation, using the assumed values given just above for article length and spacing of the operative elements. When the leading edge of the 36 inch article passes finger 2, condenser 68 begins to discharge, and when the trailing edge of the article passes finger 1, 21 units of energy have been dissipated from both condensers 39 and 68 and the half fold is just being executed. At the moment when the trailing edge passes finger 1, as explained for the quarter fold in connection with Fig. 1, the discharge rate of condenser 68 is quadrupled. At this moment also the quarter point of a 36 inch article is still 10½ inches from the operation point for blade 69. While the article is traveling 10½ inches 42 units of charge will be dissipated at quadruple rate, and on adding this 42 units to the 21 units discharged at the normal rate we have 63 units as the total charge for condenser 68.

A complete operation will now be followed through for a half-quarter fold on an article of intermediate length, say 24 inches. When the leading edge of the article intercepts finger 1, armatures 34 and 80 move to position a. When the leading edge traverses another 15 inches and intercepts finger 2, condensers 39 and 68 begin to discharge at normal rate, and continue so to do while the trailing edge which is nine inches back of finger 1 advances to the point where it passes finger 1. This portion of the operation dissipates 9 units of energy from condenser 39, leaving 12 units, and 9 units from condenser 68, leaving 54 units. Discharge of condenser 39 now proceeds at doubled rate and that of condenser 68 at quadruple rate.

When the trailing edge of the 24 inch article passes finger 1 the mid-point of the article is still 6 inches away from registry with blade 14 and while the article traverses these 6 inches, twelve units of energy from condenser 39 are discharged at the accelerated rate, bringing said condenser to its end point of discharge, and permitting operation of blade 14.

When condenser 68 begins its accelerated discharge the quarter point of the 24 inch article is 13½ inches from blade 69 and since travel of the article through this distance is at quadrupled rate, it represents 54 units of energy corresponding to the residual charge in condenser 68. Therefore, when the quarter point of the article registers with blade 69, condenser 68 reaches its end point of discharge, permitting normal operation of tube D to energize relay 70 and thereby energize solenoid 71 to operate blade 69.

Both condensers 39 and 68 are recharged as the trailing edge of the article passes finger 2. If for any reason it is desired to execute only the first or mid-point operation, switch 88 is opened. This switch is in series with solenoid 71 and when the switch is open blade 69 remains in its inoperative position. Under such conditions an article which has been folded at the mid-point leaves the machine by chute 16, whereas when blade 69 executes a second fold in conjunction with rolls 12 and 12a, the article leaves the machine by chute 16a.

*Charging control proportioned to article speed*

In the circuit arrangements shown in Figs. 1 and 3, condenser 39 is given a definite charge and its discharge rate is entirely dependent on the resistance the discharging current encounters in its circuit, and it is assumed the conveyor belt 10 causes travel of the work at constant speed. On reflection it will appear that there is a necessary relationship between the rate of condenser discharge and the rate of travel of the articles being operated upon. Thus if the rate of article advance is accelerated after the condenser charge has been determined, the operation point on the article will have passed the operating mechanism before said mechanism is energized, so that an error of indeterminable extent will result in each operation.

This can be corrected in several ways, for instance by introducing a compensating variation in the resistance value of the discharging circuit, dependent on the article speed, or by varying the value of the condenser charge, dependent on the article speed. I have selected the latter expedient, and have illustrated, in Fig. 2, a circuit modification wherein a compensating bucking voltage is opposed to the charging voltage, the bucking voltage being directly proportioned to the rate of advance of the article, for the following reason:

It is apparent that if the article speed increases, the condenser discharge should take place in a shorter time, and consequently, in my present modification, the original condenser charge should be smaller. This means that the opposed bucking voltage must be increased, and it is obvious both from abstract consideration and actual trial that there is a direct relationship between the increase in speed, and the increase in opposing voltage thereby required.

Figure 2:
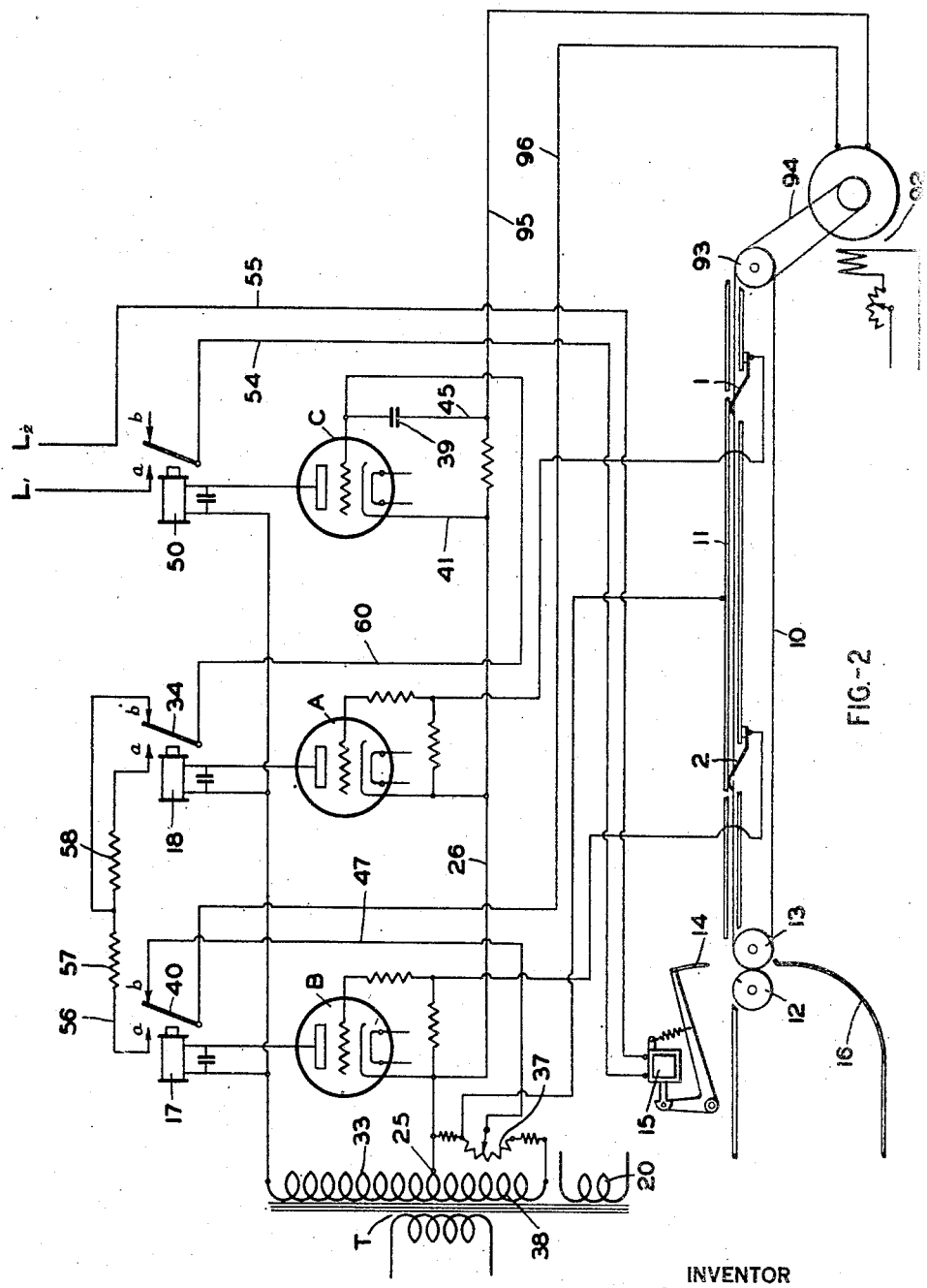
Fig. 2 is a similar view, illustrating an arrangement providing speed controlled voltage for charging the control capacitance.

I have therefore interposed a direct current generator 92 (Fig. 2) in the charging circuit for condenser 39, the generator being driven directly from roll 93 as by a belt 94 or in any other suitable manner. This insures a direct relationship between a change in speed of article travel, and a change in speed, and consequently current output, of generator 92. The generator is properly connected so that its output is opposed in polarity to the charging voltage which is rectified in tube C. A variable voltage divider 37 across the secondary of transformer T is used to predetermine the basic charging rate. The complete charging circuit as shown in Fig. 2 is as follows; from terminal 25 on the secondary of transformer T through conductors 26 and 41, cathode to grid of tube C, condenser 39, and from the condenser through conductors 45 and 95 to generator 92, from the generator through conductor 96, armature 40 in position b, and conductor 47 back to the voltage divider in the secondary of transformer T.

The following table shows one example of the relationship between the several variables when the rectified charging voltage is based at 120 volts.

| Article speed (feet per min.) | Rectified voltage | Bucking voltage | Resultant charging voltage |
|---|---|---|---|
| 90 | 120 | 90 | 30 |
| 60 | 120 | 60 | 60 |
| 30 | 120 | 30 | 90 |

The table illustrates the direct relationship existing between the article speed and the bucking voltage, and the inverse relationship between the article speed and the charging voltage. It is further apparent that when the rectified voltage is held at 120 volts, the article speed and bucking voltage are conveniently identical.

The modification just described imposes an automatic compensating control which insures the accurate positioning of an operation, regardless of variations in article speed, since the apparatus diagrammatically illustrated in Fig. 2 is immediately responsive to speed variations. However, the speed variations for which I thus supply compensation are not small variations such as might occur during one cycle of operation of the machine, but preselected wider variations chosen for convenience. One kind of article might require one speed and another article might be best treated at twice the former speed, etc.

The discharging circuit for condenser 39 is as follows. From condenser 39 through conductor 60 to armature 34, thence alternately through one or both of resistors 57 and 58, conductor 56, armature 40 in position a, conductor 96 to generator 92, and from the generator by conductors 95 and 45 back to the condenser.

With an arrangement such as described, including the generator 92, it is obvious that the actual charge applied to capacitance 39, during the charging operation, is dependent upon the compensating effect of generator 92, whose output is opposed to or bucks the output of the normal charging source, voltage divider 37. And the effect is in step with variations in speed of travel of the belts carrying the articles to be folded and which serve as the driver for generator 92. As the speed of travel of the articles increases the charge of capacitance 39 is reduced. The net result is that even though the actual period of maximum time delay may vary from time to time, with variation in speed of travel of the articles, the time delay periods for articles of different length will always bear the same proportionate relation to each other, regardless of variations in speed of travel of the articles. That result is not affected, in the instance being described, by the fact that generator 92 is also included in the discharging circuit for capacitance 39, because said generator is then ineffective to vary the time of discharge and becomes no more than a current conductor in the discharging circuit, as will be readily understood.

Figs. 4 to 7 inclusive illustrate another embodiment of the invention in which the control devices are of electromechanical form, i. e., they embody both electrical circuits and mechanical devices. The mechanical devices are of the same general form illustrated, described and claimed in Letters Patent No. 2,034,040, granted March 17, 1936, to Oscar W. Johnson, to which reference may be had for a more complete description of the mechanical devices here described but briefly, if necessary or desirable. The electrical devices, however, include two suitable trip fingers or devices spaced apart along the path of movement of the articles to the folding devices, as in those embodiments of the invention before described, enabling measurement of the article and its positioning with respect to the folding devices to be accomplished by measurement of only a portion of the length of each article, instead of its full length. In other words, in this machine, as in those before described, for measuring purposes the length of each article is reduced by a constant, and more particularly by the length of the minimum length article to be folded. The control devices illustrate clearly that the time delay relay of the present invention need not depend for its operation upon the dissipation or collection of a charge of energy, such as the charge of a capacitance, or even require use of an electron discharge device, but said time delay relay may be of other forms and operate in any suitable manner, such, for example, as in the Johnson patent before referred to, where the time delay is controlled by movement of a contact finger over a path and is dependent upon the amount of movement of that finger and its rate of movement during different increments of travel, as determined by the control mechanism.

The mechanical devices of the time delay relay or timer are best illustrated in Figs. 5, 6 and 7.

As illustrated a rotatable shaft 100, through suitable change speed mechanisms, marked generally 101 at the right and 102 at the left, in Fig. 6, drives low speed wheels 103, 104. Fixed to the shaft for direct rotation therewith is a full speed wheel 105. As will appear, two low speed wheels are desirable for the production of two folds in an article and accordingly, the transmission mechanism 101 may be set to give wheel 103 either one-half or two-thirds full speed, and the transmission mechanism 102 to give wheel 104 either one-quarter or one-third full speed.

Each of the wheels 103, 104, 105 is provided with teeth 106 on its outer periphery for engagement by latch fingers 107, 107a, of arms or travelers, several of which, marked 108, are mounted for rotation on the shaft 100 between wheels 105 and 103 and several others of which, 108a, are mounted for rotation between wheels 104, 105.

Operation of the timer is initiated by energization of the solenoid 109 which, through linkage 110 rotates shafts 111 against the effect of their torsion springs 112 to move outwardly annular cam bars 113, Fig. 7 (see top of Fig. 6) to swing the latch finger 107 on the arm 108 or 108a which is at the release point (at the bottom in Fig. 5) into engagement with a low speed wheel 103 or 104, as the case may be, thus interlocking the latch with the wheel and causing the arm to which it is attached to move with the wheel and, therefore, at its speed.

Let us now consider, for example, the production of two folds in an article, one at the half point and the other at the quarter point, in which case the transmissions are set to cause wheel 103 to rotate at half full speed and wheel 104 at quarter full speed.

Figure 4:
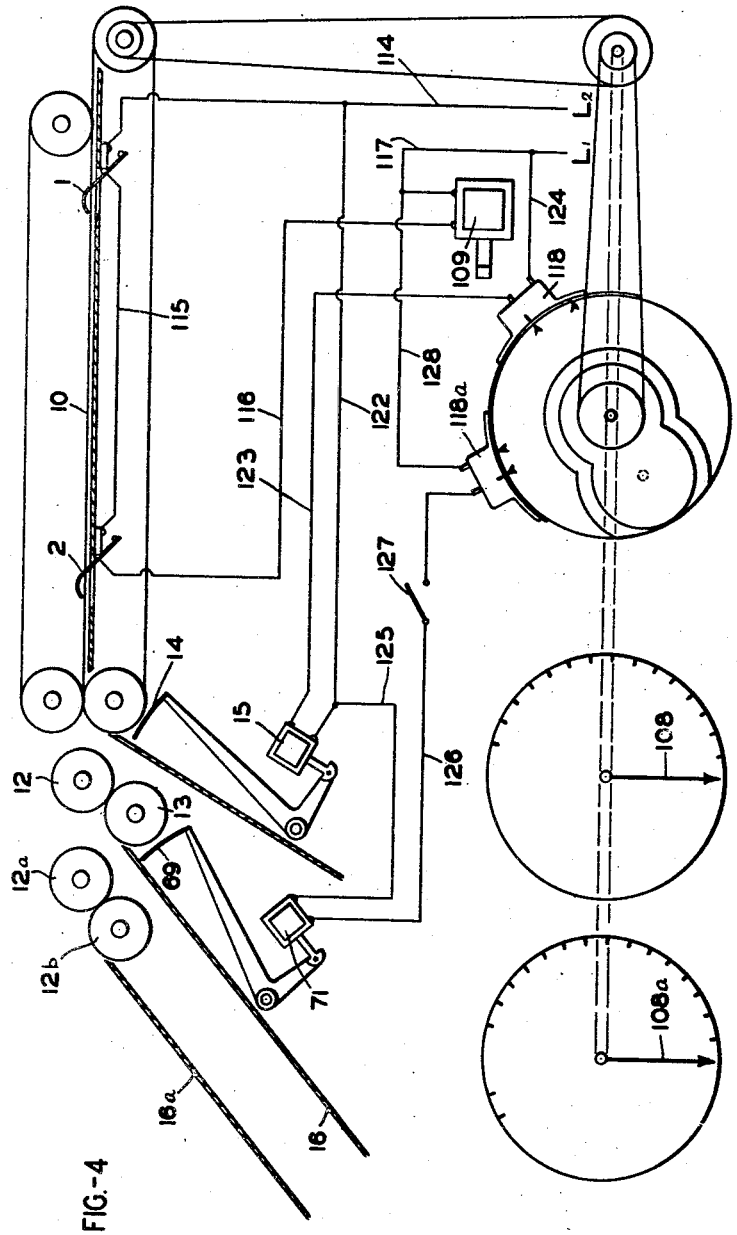
Fig. 4 is a schematic view, showing electromechanical control means embodying the invention and applied to a folding machine.

Referring to Fig. 4, at the instant the leading edge of the article engages trip 1, nothing happens, but as soon as the leading edge engages trip 2, so that both trips are closed, a circuit is established from L2 by way of wire 114, trip 1, wire 115, trip 2, wire 116, solenoid 109 and wire 117 to L1, initiating the coupling operation just described. The two arms 108 and 108a, coupled to the wheels 103, 104 immediately start travelling with said wheels. Their travel is continued until the trailing edge of the article passes trip 1, which determines the location of the folds to be produced, by opening the circuit just described, permitting solenoid 109 to de-energize, whereupon the returning springs 112 rotate shafts 111 in the reverse direction, the cams 113 recede, the latches 107 turn, and their inner arms 107a engage the teeth of the full speed wheel 105, so that their rotation is now at full speed.

On the outside of the timing casing, in housings 118 and 118a, and adjustable circumferentially of the casing, are two switch devices, marked generally 119, 119a.

Switch 119 is used for causing operation of the first folding device. Accordingly it is adjusted circumferentially of the casing to a position appropriate to the production of a half fold. Switch 119a is used similarly for the second fold. These switches are normally open. Each includes a depending arm 120 adapted to be engaged by a finger 121 on one of the cooperating arms 108 or 108a. Thus, when an arm 108, rotating at full speed, reaches a position where its finger 121 engages the arm 120 and closes switch 119, a circuit for producing the first fold is established as follows: from L2 by way of wire 114, wire 122, solenoid 15, wire 123, switch 119 and wire 124 and wire 117 to L1. Energization of solenoid 115 actuates folding blade 14, as before, causing it to engage the article at its mid-point and introduce it to the folding rolls 12, 13.

When arm 108a actuates switch 119a for producing the second fold, a circuit is established as follows: from L2 by wires 114 and 122 to the wire 125, solenoid 71, wire 126, switch 127, switch 119a, wire 128, wire 117 to L1. Assuming switch 127 closed, actuation of switch 119a energizes solenoid 71 and actuates folding blade 69, to engage the article (now folded once) at its midpoint (the quarter point) and introduces it to the folding rolls 12a, 12b.

Switch 127 is normally closed and is manually operated, and may be opened at any time when but a single fold is desired, in which case the article is delivered to chute 16. When two folds are produced it is delivered to chute 16a.

By proper adjustment of the switches 119, 119a to other points along the casing, folds may be produced at the two-thirds and one-third points, or at any other desired points, it being assumed that appropriate adjustments are made in the transmissions 101, 102 to move wheels 103, 104 at the proper speeds.

In this machine, measurement of the article begins when its leading edge engages trip 2, and is completed when its trailing edge engages trip 1. Thus only a portion of the article is measured, to-wit, its full length reduced by a constant, to-wit, the distance between the two trips.

Here, instead of controlling the folding by proper use of a calculated fixed charge applied to a capacitance, as in the forms before described, the folding is controlled by proper use of the distance an arm, such as 108 or 108a, is permitted to travel from the starting point (at the bottom in Fig. 5) until it reaches the appropriate switch 119 or 119a. This distance may be calculated in the same manner employed for calculation of the capacitance charge in the form before described, and the switch is then adjusted to and fixed at the predetermined position, as will be readily understood.

When finger 108 or 108a is released, by engagement of the article with both trips, it begins to travel at the reduced speed, one-half or one-quarter or any other predetermined proportion of full speed, as may be required, and when the trailing edge of the article passes the first trip, the latch finger is thrown over to couple the arm with the full speed wheel, and it continues its advance at full speed until the switch 119 or 119a is engaged, which closes the circuit to energize the appropriate solenoid and actuate the folding blade. Thus, here, instead of using units of capacitance, by increments, as in the form before described, the control mechanism uses units of distance or motion, by increments, but in just the same manner and for exactly the same purpose. The mechanism is obviously capable of adjustment to meet any desired conditions as respects number and locations of fold with respect to the length of the article, regardless of the length of the article, within reasonable limits, such as between a selected minimum and maximum, as before.

In certain of its aspects the present invention does not require the use of trip devices spaced apart along the path of relative travel between the article and folding device, in connection with a time delay relay of the character here involved. More particularly, a time delay relay including an electron discharge device may be so arranged as to permit actuation thereof by a single trip, not only for the production of a fold in an article, not proportionally to its length, for example, at a definite distance from one edge thereof, but also in proportion to its length, regardless of the actual length. These aspects of the invention will now be referred to more in detail.

Figure 8:
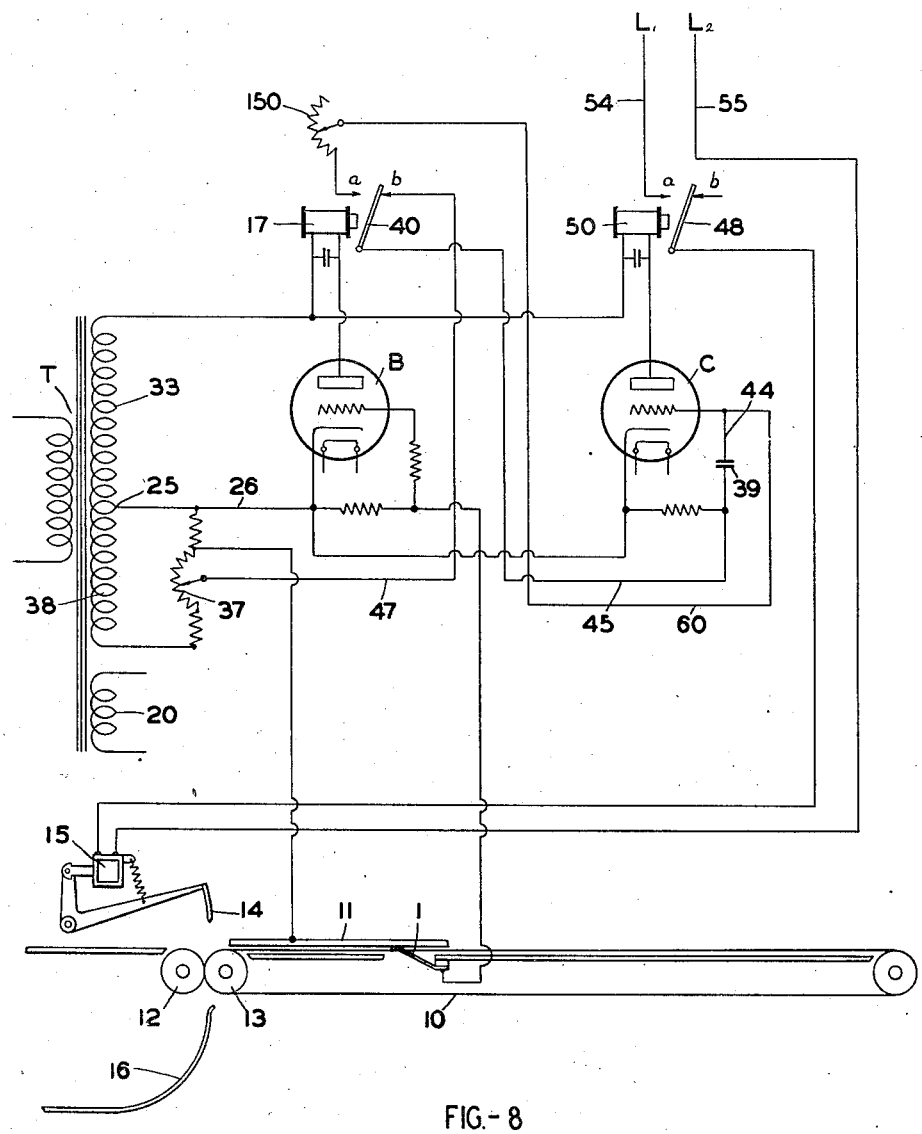
Fig 8 is a diagram, corresponding to Fig. 1, and illustrating another simple form of the invention.

Fig. 8 illustrates a simple arrangement, again embodied for purposes of illustration in a folding machine, in which the article is folded at a definite distance from one of its edges, say the leading edge. The circuits of the control mechanism are much like those in the arrangements shown in Fig. 1. The electron discharge valve A, of Fig. 1, however, has been omitted and the time delay relay system includes only the valves B and C, associated respectively with relay coils 17, 50, having armatures 40, 48. A single trip device 1 is employed and the folding machine, as before, includes the work carrying belt 10, the folding rolls 12, 13, the folding blade 14 and the actuating solenoid 15 therefor.

Without specific description of the various elements, on account of their similarity to those of Fig. 1, the operation may be described as follows:

The apparatus operates, of course, only with respect to all articles which in length exceed a predetermined minimum, to-wit, the distance between trip device 1 and the folding blade 14. All articles exceeding that minimum length will receive a folding operation at the same distance from the leading edge of each article, a distance determined by the charge initially placed in capacitance 39 of the valve C. Charging of said capacitance, as before, is by half wave rectification through a circuit as follows: from the secondary 38 of transformer T, at the point 25, by way of wire 26, cathode to grid of the valve C, wire 44, capacitance 39, wire 45, armature 40 in position b, wire 47, and potentiometer 37 to the secondary of the transformer.

When capacitance 39 is charged, it imposes a bias of cut off value on the grid of valve C, blocking flow of plate current. When the capacitance is discharged to the point where the bias imposed upon the grid is reduced to the cut off value, the plate circuit becomes conductive, current flows, and the coil of relay 50 in the circuit of this tube is energized. The armature 48 of this coil closes the circuit, through wires 54, 55, to solenoid 15 and causes operation of the folding blade to introduce the article between the folding rolls 12, 13. This occurs at a point spaced the proper distance from the leading edge of the article.

Let us assume the condenser charged, that all connections to the supply voltage are closed, and that the machine is running at the prescribed speed. Normally closed trip device 1 engages the plate 11, supplementary bias above cut off value is imposed upon the grid of valve B, flow of plate current in that valve is blocked, relay 17 is open and its armature 40 is in position b, the charging position. When the leading edge of an article intercepts trip device 1, the supplementary bias circuit to valve B is opened, normal bias is restored, its grid potential reaches the cut off point, the plate circuit becomes conductive, relay 17 closes and its armature moves to position a. Capacitance 39 now begins to discharge through a circuit as follows: from the capacitance by wires 44 and 60 to resistance 150, thence through armature 40 and wire 45 back to the capacitance. When the condenser has discharged (at a rate governed by the resistance 150) to an extent sufficient to adjust its grid potential to the cut off point or control value, plate current flows in valve C, closing relay 50, with movement of armature 48 to its a position, thereby energizing solenoid 15 and producing the fold, in the manner before described.

Adjustment for producing folds at different distances from the leading edge of the article of course may be made by varying the adjustable resistance 150. Also, like adjustment may be made by varying the initial charge imposed upon the capacitance 39, such as by appropriate adjustment of the potentiometer 37. Or, adjustment may be made by adjustment of both potentiometer 37 and resistance 150.

Figure 9:
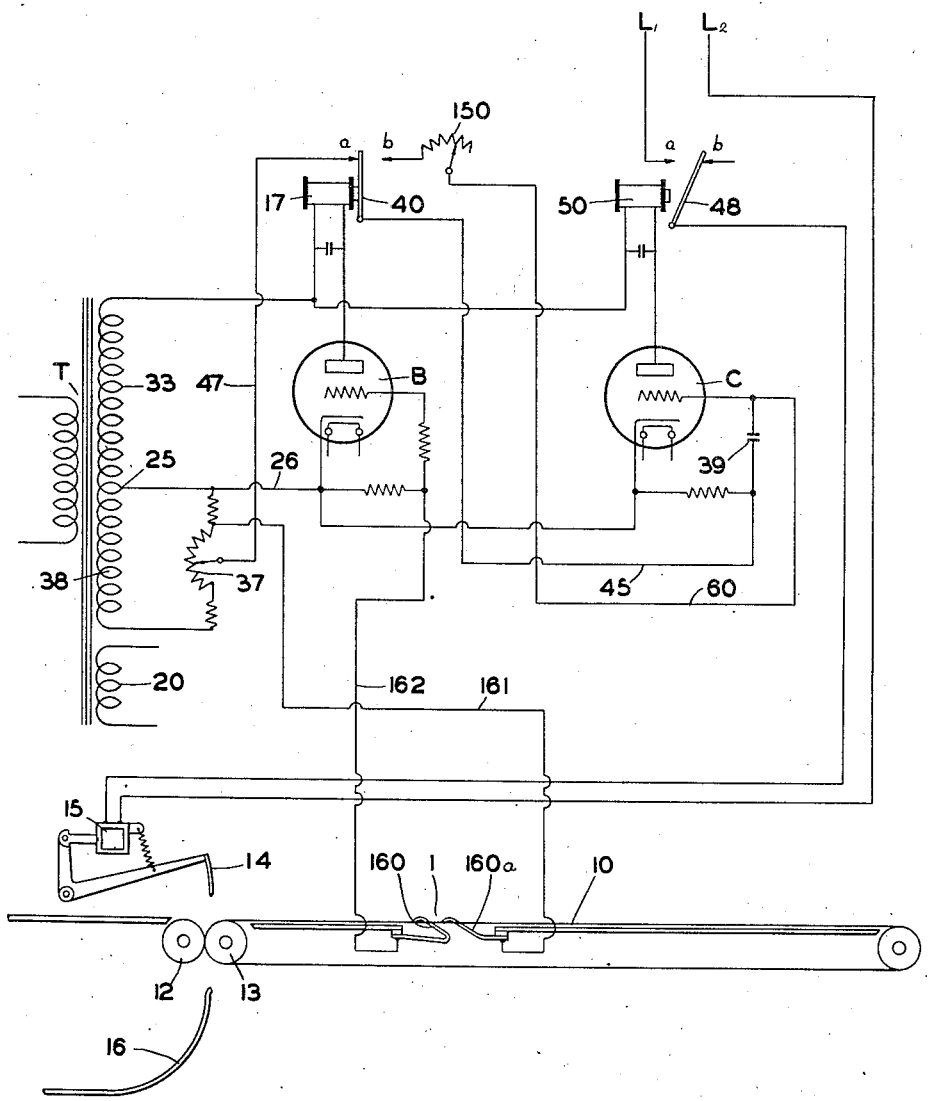
Figs. 9 to 12 are similar views, illustrating still other forms.

Fig. 9 shows a modified form of the control system shown in Fig. 8, differing therefrom only in that the trip device, generally marked 1, is normally open, instead of normally closed. Of course, in all of the devices before described, the trip device need not be a yieldable finger cooperating with a conducting plate so that an electric circuit is interrupted by passage of the article, but the trip device may be of other forms, such as one including a light beam, or a small jet of air again interrupted by passage of the article and producing a controlling effect upon a relay. In some cases, electrical conductivity of the article may be taken advantage of, such as when the operation is performed upon electrically conductive materials, such as metal sheets, either for folding the same or for producing any other operation with respect thereto.

In the arrangement of Fig. 9 the trip device, marked generally 1, includes two fingers 160, 160a, both in the controlling circuit and arranged to be simultaneously contacted by an article being advanced by the belt 10 to the folding device, and thus adapted to close the circuit when engaged by an article.

In contrast to the form shown in Fig. 8, when no article engages the fingers of the trip device 1, normal bias is imposed upon the grid of valve B and its relay 17 is normally closed. Under these conditions the capacitance 39 is charged by a circuit as follows: from the capacitance 39 by way of wire 45 and armature 40 to wire 47, thence to potentiometer 37, secondary 38 of transformer T and wire 26, and through the cathode and grid of valve C to the capacitance.

When the leading edge of the article engages the fingers 160, 160a of trip device 1 a circuit is completed by way of wires 161, 162, to impose extra bias on the grid of valve B, blocking flow of current in its plate circuit and de-energizing the relay 17, the armature of which moves to position B. Capacitance 39 then discharges through a circuit as follows: from the capacitance 39 by way of wire 60, resistance 150, armature 40 and wire 45 to the capacitance.

When the capacitance is fully discharged the potential of valve C is reduced to the cut off point or control value, its plate circuit becomes conductive, relay 50 is energized and its armature 48 closes the circuit through the actuating solenoid 15, as before.

Figure 10:
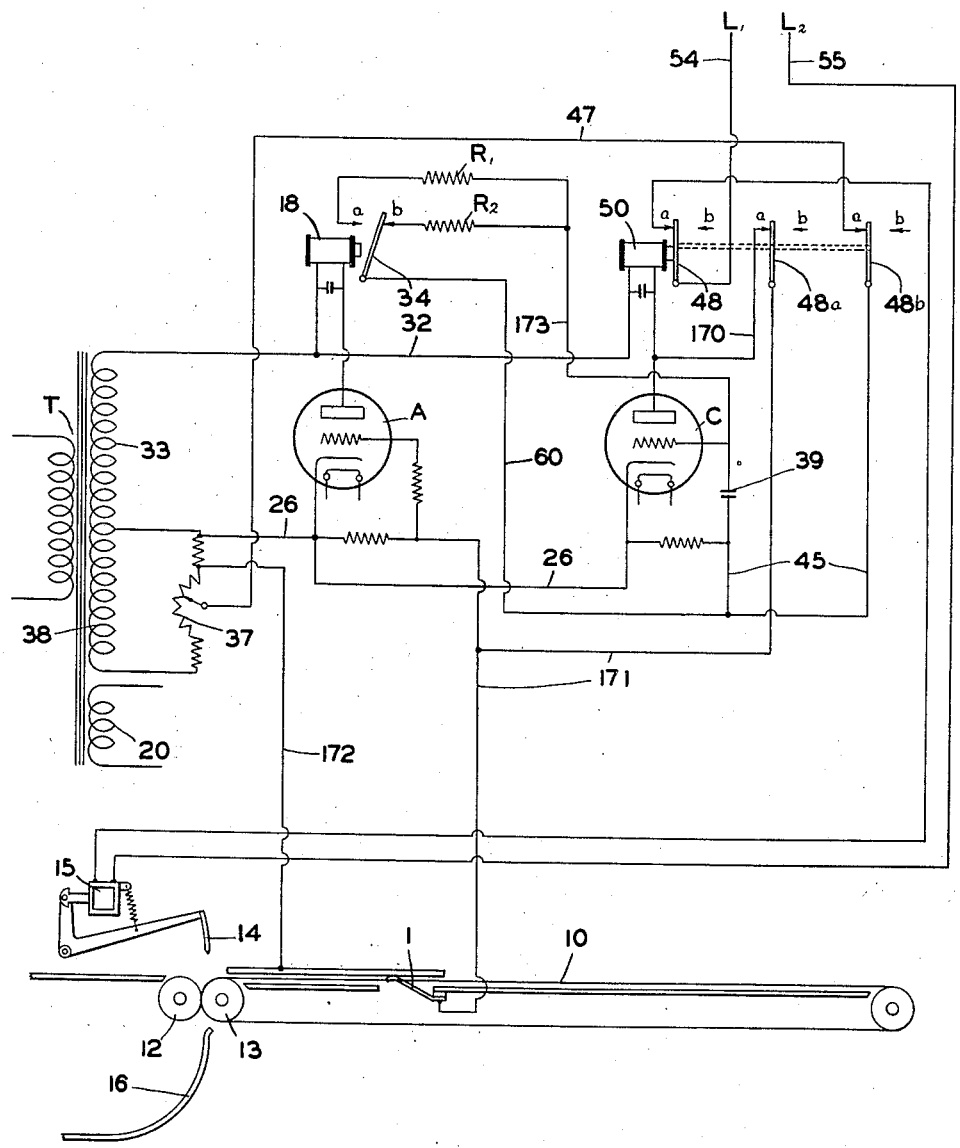

Apparatus embodying the present invention, and performing an operation with respect to an article at a point located upon it proportionately to its length, does not always require the use of two contact elements or trips engaged by the article during the course of relative motion between the article and the device which performs an operation with respect to it. For example, Fig. 10 illustrates an arrangement requiring the use of but a single contact element or trip.

In this arrangement many of the parts are like those heretofore described and require no specific description. As before, the electron discharge device A, controlled by the trip device 1, actuates a relay 18 provided with the armature 34. The time delay electronic device C actuates a relay 50, provided with armatures 48, 48a, and 48b. All of the armatures have positions a and b as before.

This system operates as follows:

Let it be assumed that the control system as a whole has been shut down, with no current flowing in any of the circuits. The time delay controlling capacitance 39, therefore, is discharged.

If now the main switch (not shown) is closed, to energize the circuits and put the device into operating condition, the first operation is to charge capacity 39. When the main switch is closed, the capacity 39 is in discharged condition. Consequently, tube C passes current through its plate circuit, energizing relay 50, causing the armatures 48, 48a, 48b thereof to move to their a positions. This establishes a charging circuit for condenser 39, as follows: from the condenser 39 by way of wire 45 to armature 48b, in its a position, by wire 47 to the potentiometer 37, by wire 26, and through the cathode and grid of tube C to the capacity 39.

The capacity 39 charges almost instantaneously, and when charged imposes cut-off bias on the grid of tube C, stopping plate current flow. The relay 50 apparently would become de-energized, but energization of said relay is maintained through a maintaining circuit as follows:

From secondary source 33 by way of wire 32 to and through the relay 50, by wire 170, through armature 48a, and wire 171 to trip 1, and by wire 172 to the secondary 33. Therefore, condenser charge is maintained. It is realized that the operating solenoid 15 is also energized by its circuit wires 54, 55, due to the fact that armature 48 is in the $a$ position, but this is immaterial, as will appear.

When an article is moving to the device upon which an operation is to be performed by actuation of the solenoid 15, and its leading edge intercepts or actuates the trip 1, the maintaining circuit before described is opened, causing relay 50 to de-energize, the armatures 48, 48a, 48b thereof moving to their $b$ positions. Movement of armature 58 opens the circuit to solenoid 15, which moves back to its retracted position. Immediately, the capacity 39 begins to discharge through a circuit as follows: from capacity 39 by wires 45 and 60 to armature 34 (in its $a$ position due to the fact that trip 1 is open and the plate circuit of electronic device A is conductive) by resistance $R_1$ and wire 173 back to the capacitance. Discharge thereof continues until the trailing edge of the article passes trip 1. Thereupon, the grid circuit of electronic discharge valve A is overbiased, its plate circuit becomes nonconductive, relay 18 is de-energized and its armature 34 moves to its $b$ position. Thereupon the balance of the charge in capacitance 39, in the case of an intermediate length article, is discharged through a second resistance $R_2$. By giving the second resistance $R_2$ a value different from that of resistance $R_1$, the rate of discharge of the remaining charge in the capacitance may be made different from that portion discharged while the article was passing trip 1.

When the capacitance 39 is fully discharged, relay 50 is energized, armatures 48, 48a and 48b thereof move to their $a$ positions, and the circuit to operating solenoid 15 is completed from its leads 54, 55 by way of armature 48, and the operation, such as a folding operation in the arrangement shown is performed.

At the same time condenser 39 is recharged through the armature 48b in the manner before described, ready for the next operation and the charge is maintained by the maintaining circuit through armature 48a until said maintaining circuit is interrupted by the leading edge of a succeeding article intercepting trip 1.

Thus, in this system a single trip or contact, associated with electron discharge valves and circuits, as described, by proper proportioning of the resistances $R_1$ and $R_2$, may be made to perform an operation with respect to an article at any point located thereon proportionately to its length, such as at the one-half point, the one-third point, the two-thirds point, or the like. And, also, as in the arrangement shown in Fig. 3, a similar system may be adapted, by a single measurement of the total length of the article, to perform two operations, such as folding operations, upon the article, at points located proportionately to its length, as at the one-third and two-thirds points.

In forms previously described, variation in grid potential of the electron discharge valve controlling the period of time delay is accomplished by variation in the resistance through which the charged capacitance is permitted to discharge. But any suitable arrangement for modifying grid potential, and particularly for varying the rate of modification by steps or increments, may be employed.

Figure 11:
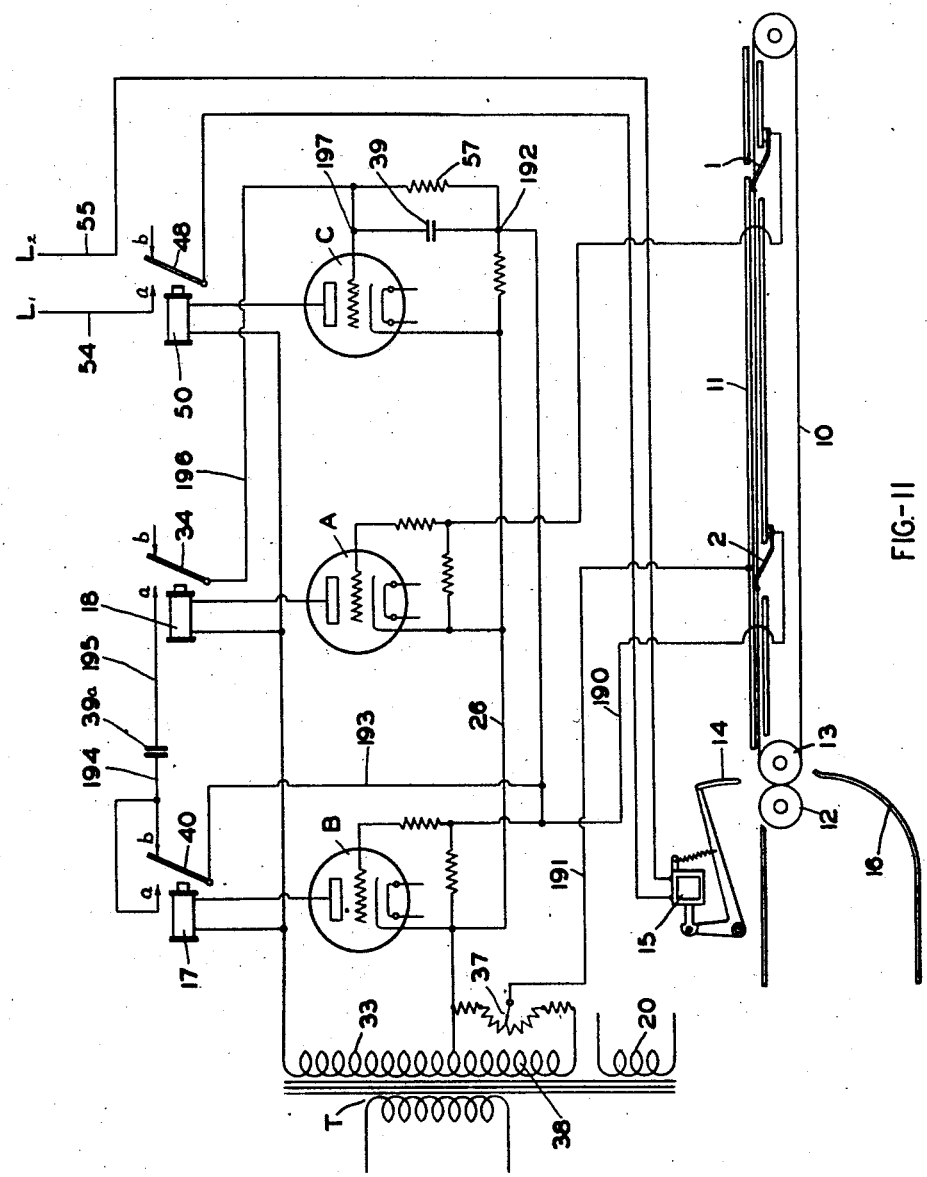

Fig. 11 illustrates an arrangement for discharging a capacitance through a single resistance, with a change in condenser capacity accomplished during the period of time delay. The circuit, generally speaking, is like those previously described, involving first and second trip devices 1, 2, the operating solenoid 15, electron discharge valves A, B and C with their corresponding relays 18, 17 and 50 and their respective armatures 34, 40 and 48, capacity 39, transformer T, and the other usual parts associated therewith and controlled thereby. The operation of this control is as follows:

Assuming trip finger 2 in contact with the conducting plate 11, condenser 39 is charged from the secondary 38, through the cathode and grid of valve C, by a circuit as follows: from the capacity 39 by conductor 190, trip finger 2, conducting plate 11, conductor 191, potentiometer 37, conductor 26, and the cathode and grid of valve C to the capacity 39.

When the leading edge of an article engages trip 1, the relay 18 of valve A closes, its armature 34 thereby including a second capacity 39a, in parallel with condenser 39, across the same source of potential which is charging it. The charging circuit for capacity 39a is as follows: from the point 192, just below capacity 39, by conductor 193 to armature 40 in its $b$ position, by wire 194 to capacity 39a, by wire 195 to the armature 34 in its $a$ position, and by wire 196 to the point 197 just above capacity 39. Capacity 39a is therefore charged in the same manner as capacity 39, and assuming the capacities to be exactly alike, each has the same charge.

When the leading edge of the article engages trip 2, relay 17 closes, and the charging circuit for capacities 39 and 39a just described is opened at trip 2 and capacities 39 and 39a begin to discharge through the same resistance 57, which is shorted through both of them, capacity 39a by way of the armature 40, as will be clearly understood.

When the trailing edge of the article passes trip 1, relay 18 opens, which disconnects capacity 39a and only the balance of the charge remaining in capacity 39 continues to discharge through resistance 57. During the second increment of the time delay period, therefore, condenser capacity, which is the sum of the capacities of the two equal capacitances 39, 39a, is halved when the trailing edge of the article passes contact 1, and the time of discharge is reduced to one-half what it would be if both capacities remained in circuit.

When capacity 39 is fully discharged the center of the article has been registered with the folding point, relay 50 closes, energizing solenoid 15, and the operation is performed.

Of course, some charge remains in capacity 39a, but ultimately, when it is again included in the circuit, its charge is built up to full value, equal to that imparted to capacity 39, and the operation is repeated.

Figure 12:
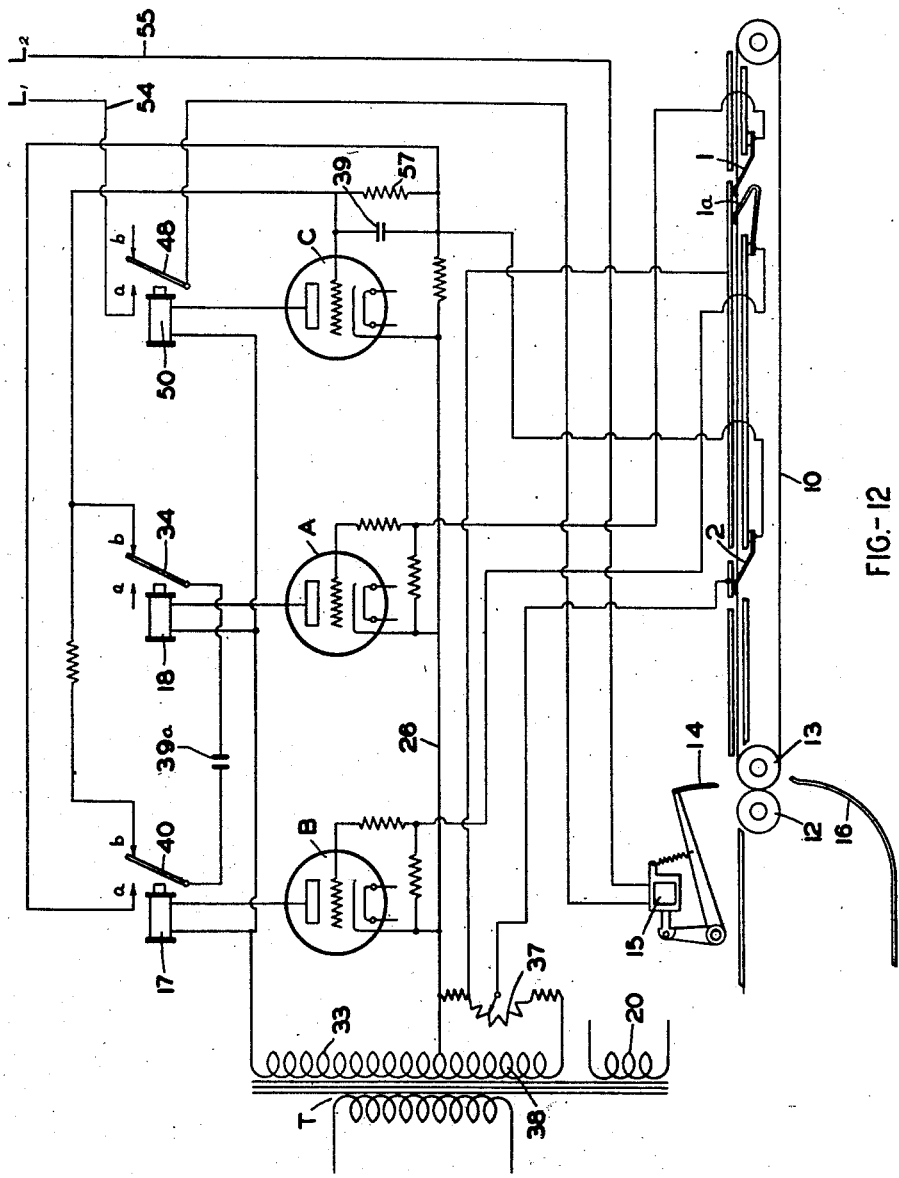

Fig. 12 illustrates another corresponding arrangement involving multiple trip control, as before, and measuring and timing by the discharge of a capacity through a single resistance, as in Fig. 11, but with a change in the condenser charge.

In this arrangement it may be assumed that capacity 39 is charged from the transformer secondary 38 by a circuit corresponding to that in Fig. 11 and including trip 2. In both forms, of course, resistance 57 always remains shorted across the capacity, so that there is continual discharge, but the charge of the capacitance is maintained at full value by the charging circuit until the article engages the trip 2 and disconnects the charging circuit, when discharge becomes effective for measuring purposes.

Here, as before, when the leading edge of the article engages trip 2 the condenser charge circuit is broken and the condenser begins to discharge through resistance 57. When the trailing edge of the article passes trip 1 relay 18 opens. Since relay 17 is now closed, a circuit is completed, putting capacity 39a in parallel with capacity 39, as before. The balance of the charge in capacity 39 is now divided between capacities 39 and 39a. In other words, one-half of the balance spills over from 39 into 39a.

When the trailing edge passes trip 1a, which is very close to trip 1, relay 17 opens and the charge in capacity 39a is immediately discharged. The balance in capacity 39, which is now one-half of the original balance, continues to discharge through resistance 57.

When the center of the article reaches the folding point, capacity 39 is fully discharged and relay 50 closes, causing operation of the folding blade actuating solenoid 15, as before.

In the case of a maximum length article, the capacity 39 is discharged immediately when the trailing edge reaches contact 1, and the folding operation is promptly performed.

In this arrangement, while the article is engaged with all trip fingers, discharge is taking place from full condenser charge of capacity 39, and when the trailing edge of the article passes trip finger 1, the balance of the charge of capacity 39 has been cut in half, and that half continues to discharge through resistance 57, with results as before.

What I claim is:

1. A timing relay, comprising a grid controlled electron discharge device arranged to be energized from a source of voltage, an anode-cathode circuit for said device including said source of voltage, means for applying potential to the grid of such value as to maintain the anode-cathode circuit nonconductive, means for changing the value of such potential during sequential steps at different substantially uniform rates of change until it reaches the critical control value and the anode-cathode circuit becomes conductive, and means whereby the change is caused during a total time delay period determined according to the equation:

$$C = A + (D-A)E$$

where
$C$ = the total time delay period
$A$ = the period of change of grid potential at the first rate of change
$D$ = the maximum possible period of change at the first rate of change, and
$E$ = the ratio of the first to the second rate of change.

2. Apparatus of the character described, comprising means for moving articles in succession along a path, time delay relay means adapted for continuous adjustment during a time period to an operating condition, means controlled by actuation thereof for performing an operation with respect to an article, first and second trip devices spaced along the path of movement of the articles, means operatively connecting said trip devices to said relay means whereby said relay means is sensitive to the length of moving articles and arranged upon engagement of an article with both trip devices to initiate and then cause continuous adjustment of said relay means at one rate, said means including means sensitive to disengagement of said article from the first trip device for initiating and then causing continuous adjustment of said relay means at another rate, whereby performance of said operation is delayed by a period proportional to article length.

3. Apparatus of the character described, comprising an operating device, means for producing relative motion along a path between said device and articles to be operated upon, first and second trips spaced along said path, time delay relay means for controlling said operating device, means operatively connecting said trips to said relay means and arranged upon engagement of an article with both trips for causing measurement of a portion of the length of the article in accordance with and responsive to its length and rate of motion, said means including means effective upon disengagement of the article from the first trip for concluding such measurement and for also adjusting the relay means in a manner to cause subsequent delayed operation of said operating device at a time dependent upon article length.

4. Apparatus of the character described, comprising means for moving articles in succession along a path, time delay relay means adapted for continuous adjustment during a time period to an operating condition, means controlled by actuation thereof for performing an operation with respect to an article, first and second trip devices spaced along the path of movement of the articles, means operatively connecting said trip devices to said relay means whereby said relay means is sensitive to the length of moving articles and arranged upon engagement of an article with both trip devices to initiate and then cause continuous adjustment of said relay means at one rate, said means including means sensitive to disengagement of said article from the first trip device for initiating and then causing continuous adjustment of said relay means at another rate, whereby performance of said operation is delayed by a period proportional to article length, and means unaffected by engagement of a following article with the first trip for maintaining adjustment of said relay means at the second rate until the leading article passes the second trip.

5. Apparatus for folding articles of lengths varying between a preselected minimum and a preselected maximum, comprising a folding device, means for feeding articles thereto in succession along a path, and controlling means for said folding device, including a timing relay, first and second trips spaced apart along the path of travel of the articles by said minimum length, and means operatively connecting the trips to the relay and operated when both thereof are engaged by an article for initiating relay operation, said connecting means including means arranged when the trailing edge of an article passes the first trip to cause said relay to produce subsequent operation of said folding device delayed by a time period dependent upon both article motion and article length.

6. Apparatus for folding articles of lengths varying between a preselected minimum and a preselected maximum, comprising a folding device, means for feeding articles thereto in succession along a path, and controlling means for said folding device, including a timing relay, first and second trips spaced apart along the path of travel of the articles by said minimum length, means operatively connecting the trips to the relay and operated when both thereof are engaged by an article for initiating relay operation, said connecting means including means arranged when the trailing edge of an article passes the first trip to cause said relay to produce subsequent operation of said folding device delayed by a time period dependent upon both article motion and article length, and means unaffected by engagement of a following article with the first trip for maintaining adjustment of said relay means at the second rate until the leading article passes the second trip.

7. In apparatus of the type including in combination, an operating device, means for producing relative motion along a path between said device and articles to be operated upon and controlling means for said device, an improved form of controlling means therefor, comprising an electric relay having a charged capacitance, means sensitive to and operated during said relative motion for causing partial discharge of said capacitance to an extent dependent upon article length and for then causing completion of discharge thereof, and means also sensitive to such motion and operated at the moment of substantially complete discharge of said capacitance for causing operation of the operating device, whereby such operation is performed at a point spaced from an end of the article a distance predetermined in proportion to its total length.

8. In apparatus of the type including in combination, means for moving an article along a path, contact means in said path sensitive to passage of an article, an operating device, and control means for said device, an improved form of control means therefor, comprising a charged capacitance, means rendered effective upon substantially complete discharge thereof for causing operation of said device, and means operatively associated with said capacitance and controlled by movement of an article past said contact means for causing a series of partial discharges of said capacitance at different substantially uniform rates and for periods which vary for articles of different lengths, whereby operation of said device is delayed for a period in proportion to article length.

9. In apparatus of the type including in combination, means for moving an article along a path, contact means in said path sensitive to passage of an article, an operating device, and control means for said device, an improved form of control means therefor, comprising a charged capacitance, a resistance in circuit with said capacitance, and means operatively associated with said capacitance and controlled by movement of an article past said contact means for causing a series of partial discharges of said capacitance through various portions of said resistance selected in accordance with article length and therefore for periods which vary for articles of different length, whereby operation of said device is delayed for a period in proportion to article length.

10. In apparatus of the character described and including an operating device, means for feeding work thereto, and controlling means therefor, an improved controlling means, including a grid controlled electron discharge valve having its anode-cathode circuit in controlling association with said device, a current source, a capacitor in circuit with the grid, means normally connecting said capacitor to said source for charging said capacitor, means for interrupting said connection, a resistance, means controlled by the work feeding means for connecting said resistance to said capacitor to produce gradual discharge thereof, and means controlled by advance of the work to said device for varying the value of said resistance during a single capacitor discharge to thereby vary the time delay.

11. In apparatus for performing an operation with respect to an article of definite length and including operation performing means, means for feeding an article past said operation performing means, and a controller therefor, an improved controller, comprising a grid controlled electron discharge valve having an output circuit operatively connected to said operation performing means and also having a controlling grid circuit, means connected to said circuit for establishing and maintaining grid potential at a value other than the critical control value, said output circuit becoming effective upon said operation performing means when the grid potential reaches said critical value, control means having a member located adjacent the path of movement of the article and operatively connected to the grid circuit and operated by the moving article and thereby sensitive to its length for causing gradual variation in the grid potential at one substantially uniform rate toward the critical value, said control means having another member also located adjacent said path and operatively connected to the grid circuit and operated by the moving article at a time determined by its length for causing continued gradual variation in the grid potential at a different substantially uniform rate, to thereby preselect the time of operation of said operation performing device in accordance with article length.

12. In apparatus of the type including an operating device, means for feeding articles along a path thereto, and controlling means for said device, an improved controlling means therefor, comprising a time delay relay, including a grid controlled electron discharge valve having a controlling output circuit operatively connected to said device, a control circuit connected to the grid and including a charged capacitance for applying to the grid a potential different from the critical control potential, two trips spaced apart along said path and each adapted for actuation by the leading and trailing ends of the moving articles, operative connections from both trips to said grid circuit for causing partial discharge of said capacitance at one substantially uniform rate during the period when both trips are engaged by the article and which period is thereby dependent upon article length, and means operatively connecting the first trip to said capacitance and effective upon it at the moment when the trailing end of the article passes the first trip to cause variation in the uniform rate of capacitance discharge, whereby the total period of time delay pending operation of said device is proportional to article length.

13. In apparatus of the type including means for feeding an article along a path, an operator, and a controller therefor, an improved controller, comprising a time delay relay operatively associated with said operator, two trips spaced apart along said path, each being movable to an operating position and provided with means biasing it to a normal position, controlling means operatively associated with said relay and arranged when actuated to adjust the same from an inoperative to an effective condition, and operating means connecting both trips to said controlling means and arranged while the article is in engagement with both trips to cause continuing adjustment of said controlling means at one rate and when it passes the first trip to cause continuing adjustment thereof at a different rate, to thereby predetermine the total time delay pending operation of said relay in accordance with article length.

14. In apparatus of the type including means for feeding an article along a path, operation performing means located adjacent said path, and relay control means therefor, an improved relay control means therefor, comprising a grid controlled electron discharge device having an output circuit operatively connected to said operation performing means and a grid circuit provided with means for causing variation in its potential selectively at either of two substantially different rates, and presetting means for establishing its potential at a value other than the critical control value, two trips spaced apart along the path of movement of the article in advance of said operation performing means and operated by article movement, each trip having two positions, means operatively connecting one of said trips to said presetting means and adapted in the two trip positions to selectively render it either operative or inoperative, and means controlled by the other trip and operatively associated with said potential varying means and arranged in each of its two positions to cause a different rate of potential variation.

15. In combination, a device to be controlled, and a controlling timing relay therefor, comprising a grid controlled electron discharge valve having an output circuit in controlling association with said device and arranged to be energized from a source of voltage, a grid circuit therefor including capacitance which according to the value of its charge determines the grid potential, means for charging said capacitance to establish grid potential at a value greater than the critical control potential for said valve, means for reducing such charge during a time period terminated when the charge reaches the critical control value and thereby causes delayed response in the output circuit, and means operated by said device and effective at a selected moment during such period for changing the rate of reduction of such charge to thereby select the total period of time delay pending operation of said device.

16. In combination, a device to be controlled, and a controlling timing relay therefor comprising a grid control electron discharge valve having an output circuit in controlling association with said device and arranged to be energized from a source of voltage, a grid circuit therefor including capacitance which according to the value of its charge determines the grid potential, means for charging said capacitance to establish grid potential at a value greater than the critical control potential for said valve, resistance connected to the grid with at least a portion thereof in shunt around the capacitance for discharging the latter at one substantially uniform rate, and means operated by said device for varying the value of the discharging portion of said resistance at a selected moment during the period of discharge of said capacitance, to thereby vary the rate of discharge and select the total period of time delay pending operation of said device.

17. In a timer, a capacitor having a charge, a plurality of resistors in circuit with said capacitor, and means for causing substantially complete discharge of a single charge of said capacitor in successive increments at different rates through varying groups of said resistors, whereby the total time period of substantially complete discharge of the single charge is the sum of the periods of the successive discharge increments.

18. Apparatus of the character described, comprising a device to be controlled, and time delay controlling means therefor, including a grid controlled electron discharge valve having its anode-cathode circuit in controlling association with said device, a current source connected to the anode and cathode of said valve, the connection to the grid including capacitance, means for charging said capacitance to establish grid potential at a value greater than the critical control value for the valve, means operated by said device for first causing continuous reduction in the charge of said capacitance at one substantially uniform rate to partially discharge the same and for then causing further reduction in the charge at another substantially uniform rate until the charge reaches a value corresponding to the critical grid control potential, to thereby determine the time delay pending operation of said device.

19. In combination, a device to be controlled, and a timing relay therefor, comprising a grid controlled electron discharge valve arranged to be energized from a source of voltage, said valve having an anode-cathode circuit in controlling association with said device and including said source of voltage, means for establishing grid potential at a value greater than the critical control value, means for reducing the grid potential during a time delay period terminated when such potential reaches the critical control value and thereby causes delayed response in the anode-cathode circuit and operation of said device, and means operated by said device for causing such reduction in potential to be produced in sequential steps at different selected substantially uniform rates of reduction during successive steps, whereby operation of said device is delayed for a total period depending upon the various rates of reduction and the period during which each is effective.

20. In combination, a device to be controlled, and a timing relay therefor, comprising a grid controlled electron discharge valve arranged to be energized from a source of voltage, said valve having an anode-cathode circuit in controlling association with said device and including said source of voltage, means for establishing grid potential at a value greater than the critical control value, means for reducing the grid potential during a time delay period terminated when such potential reaches the critical control value and thereby causes delayed response in the anode-cathode circuit and operation of said device, means operated by said device for causing such reduction in potential to be produced in sequential steps at different selected substantially uniform rates of reduction during successive steps, and means also operated by said device for predetermining the duration of one of the steps of said reduction in potential, whereby operation of said device may be delayed for a period bearing any desired proportional relation to the maximum possible delay period.

21. In combination, a device to be controlled, and a timing relay therefor, comprising a grid controlled electron discharge valve arranged to be energized from a source of voltage, said valve having an anode-cathode circuit in controlling association with said device and including said source of voltage, means for establishing grid potential at a value greater than the critical control value, means for reducing the grid potential during a time delay period terminated when such potential reaches the critical control value and thereby causes delayed response in the anode-cathode circuit and operation of said device, means operated by said device for causing such reduction of potential to be produced in sequential steps at different selected substantially uniform rates of reduction during successive steps, and means also operated by said device whereby the duration of one of the steps of the reduction in potential may be predetermined at different values during different complete relay operations, whereby the total time of delay during such different relay operations varies in predetermined proportions to the maximum time of delay.

22. In the operation of a time delay relay including an electron discharge device where the total time delay pending relay operation depends upon the change in the grid potential until it reaches the critical control value and thereby produces response in the plate circuit, the method of controlling the operation of said relay, consisting in establishing a predetermined potential for the grid at a value other than its critical control value, initiating and causing continuous change in the grid potential at one substantially uniform rate of change to a value short of the critical control value, and then initiating and causing continuous change in the grid potential at a second substantially uniform but different rate of change until the critical control value is attained and responsive effect is produced in the plate circuit of said device.

23. In the operation of a time delay relay including an electron discharge device where the total time delay pending relay operation depends upon the charge in the grid potential until it reaches the critical control value and thereby produces response in the plate circuit, the method of controlling the operation of said relay to secure operations which are delayed over periods which are different from but which bear a proportional relation to each other, consisting in establishing a predetermined potential for the grid at a value other than its critical control value, initiating and causing continuous change in the grid potential at one substantially uniform rate of change to a value short of the critical control value during the first portion of a delay period, then initiating and causing continuous change in the grid potential at a second substantially uniform rate of change during the final portion of the delay period until the period is terminated by responsive effect in the plate circuit, and again operating said relay with the duration of the first portion of the delay period different from but predetermined with relation to the like portion during the first operation of said relay and with like rates of change in grid potential during corresponding portions of the two delay periods, thereby producing responsive effects in the plate circuit delayed by different total periods bearing a predetermined proportional relation to each other.

24. In a timing relay a grid controlled electron discharge device arranged to be energized from a source of voltage, an anode-cathode circuit for said device including said source of voltage, and a load to be controlled thereby, means for establishing grid potential at a value to maintain the anode-cathode circuit nonconductive, and means controlled by the load for changing grid potential during sequential steps at different substantially uniform rates during different steps until conductivity in the anode-cathode circuit is established and a controlling effect upon the load is thereby produced, whereby the time delay pending effect upon the load bears a desired proportional relation to the maximum possible delay.

25. In a timing relay a grid controlled electron discharge device arranged to be energized from a source of voltage, an anode-cathode circuit for said device including said source of voltage, and a load to be controlled thereby, means for establishing grid potential at a value to maintain the anode-cathode circuit nonconductive, means controlled by the load for changing the grid potential during sequential steps at different substantially uniform rates of change during different steps with the rates bearing a selected ratio to each other, and operating means effective upon said potential changing means and controlled by the load, thereby to render the anode-cathode circuit conductive and produce action of said device and control of the load delayed by a period governed by the duration of the several steps.

26. In the operation of a time delay relay including an electron discharge device where the total time delay depends upon change by sequential steps in the controlling grid potential until it reaches the critical control value and thereby produces response in the plate circuit, the method of controlling the operation of said relay to secure a response delayed by a period bearing a desired proportional relation to the maximum possible delay period, consisting in causing successive continuous changes in the controlling grid potential at a plurality of selected different substantially uniform rates of change during successive sequential steps of the total delay period, and controlling the duration of change at one at least of such rates, thereby to produce the desired proportional total delay.

27. Apparatus for measuring the lengths of articles varying in length between a preselected minimum and a preselected maximum, comprising means for moving an article in the direction of its length along a path at substantially uniform speed, first and second trip devices spaced apart along said path a distance equal to the length of a minimum length article, and means operatively connected to said trip devices and sensitive to the rate of article travel and arranged upon engagement of an article with both trip devices to initiate measurement with respect to the length of the article and to terminate such measurement upon disengagement of the article from the first trip device.

28. Apparatus for measuring the length of an article reduced by a constant distance, comprising means for moving an article at substantially uniform speed in the direction of its length along a path, first and second trips spaced apart along said path by said constant distance, measuring means sensitive to article motion, and means operatively connected to said trips for initiating operation of said measuring means when a moving article engages both trips, said means including means effective upon the measuring means to complete the measurement when the trailing end of the article passes the first trip.

29. In a timing relay, a grid controlled electron discharge valve having an output circuit which is either conductive or non-conductive according to whether its grid potential is on one side or the other of the critical operating value, means for establishing grid potential thereof at a value other than the critical value, means for initiating and continuing progressive variation in the grid potential at a substantially uniform rate until it passes the critical value and thus produces valve operation and a responsive effect in the output circuit, and means operating during the period of such variation but before the critical value is reached for changing the rate of variation to a different substantially uniform rate effective for different predetermined periods, to thereby determine the total time delay pending valve operation.

JOHN E. PRESTON.